(12) United States Patent
Miyashita

(10) Patent No.: US 11,154,933 B2
(45) Date of Patent: Oct. 26, 2021

(54) THREE-DIMENSIONAL SHAPED ARTICLE PRODUCTION METHOD, THREE-DIMENSIONAL SHAPED ARTICLE PRODUCTION APPARATUS, AND THREE-DIMENSIONAL SHAPED ARTICLE

(71) Applicant: SEIKO EPSON CORPORATION, Tokyo (JP)

(72) Inventor: Takeshi Miyashita, Suwa (JP)

(73) Assignee: Seiko Epson Corporation, Tokyo (JP)

(*) Notice: Subject to any disclaimer, the term of this patent is extended or adjusted under 35 U.S.C. 154(b) by 503 days.

(21) Appl. No.: 15/379,259

(22) Filed: Dec. 14, 2016

(65) Prior Publication Data

US 2017/0173688 A1 Jun. 22, 2017

(30) Foreign Application Priority Data

Dec. 17, 2015 (JP) .............................. JP2015-246770

(51) Int. Cl.

| | | |
|---|---|---|
| *B22F 3/105* | (2006.01) | |
| *B22F 12/00* | (2021.01) | |
| *C22C 29/06* | (2006.01) | |
| *C22C 32/00* | (2006.01) | |
| *C22C 29/16* | (2006.01) | |
| *B22F 7/06* | (2006.01) | |
| *C22C 29/12* | (2006.01) | |
| *B29C 64/165* | (2017.01) | |
| *B33Y 70/00* | (2020.01) | |
| *B22F 10/36* | (2021.01) | |
| *B33Y 10/00* | (2015.01) | |
| *B33Y 30/00* | (2015.01) | |
| *B33Y 80/00* | (2015.01) | |
| *B23K 26/144* | (2014.01) | |
| *B23K 26/342* | (2014.01) | |
| *B22F 7/00* | (2006.01) | |
| *B28B 1/00* | (2006.01) | |
| *B23K 103/04* | (2006.01) | |
| *B23K 103/10* | (2006.01) | |
| *B23K 103/14* | (2006.01) | |
| *B23K 103/08* | (2006.01) | |
| *B23K 103/18* | (2006.01) | |
| *B23K 103/00* | (2006.01) | |
| *B22F 10/10* | (2021.01) | |

(52) U.S. Cl.
CPC .............. *B22F 12/00* (2021.01); *B22F 7/008* (2013.01); *B22F 7/06* (2013.01); *B22F 10/36* (2021.01); *B23K 26/144* (2015.10); *B23K 26/342* (2015.10); *B28B 1/001* (2013.01); *B29C 64/165* (2017.08); *B33Y 10/00* (2014.12); *B33Y 30/00* (2014.12); *B33Y 70/00* (2014.12); *B33Y 80/00* (2014.12); *C22C 29/065* (2013.01); *C22C 29/12* (2013.01); *C22C 29/16* (2013.01); *C22C 32/0015* (2013.01); *C22C 32/0052* (2013.01); *C22C 32/0063* (2013.01); *C22C 32/0068* (2013.01); *B22F 10/10* (2021.01); *B22F 2301/052* (2013.01); *B22F 2301/058* (2013.01); *B22F 2301/15* (2013.01); *B22F 2301/205* (2013.01); *B22F 2301/35* (2013.01); *B22F 2302/105* (2013.01); *B22F 2302/20* (2013.01); *B22F 2302/253* (2013.01); *B22F 2302/256* (2013.01); *B22F 2998/10* (2013.01); *B23K 2103/05* (2018.08); *B23K 2103/10* (2018.08); *B23K 2103/14* (2018.08); *B23K 2103/15* (2018.08); *B23K 2103/18* (2018.08); *B23K 2103/52* (2018.08); *Y02P 10/25* (2015.11)

(58) Field of Classification Search
None
See application file for complete search history.

(56) References Cited

U.S. PATENT DOCUMENTS

| | | | |
|---|---|---|---|
| 5,182,170 A | 1/1993 | Marcus et al. | |
| 6,531,191 B1 | 3/2003 | Notenboom | |
| 9,221,100 B2 | 12/2015 | Schwarze et al. | |
| 2006/0180957 A1* | 8/2006 | Hopkinson | B29C 67/02 264/405 |

(Continued)

FOREIGN PATENT DOCUMENTS

| | | |
|---|---|---|
| JP | H11-508326 | 7/1999 |
| JP | 2008-184622 | 8/2008 |

(Continued)

OTHER PUBLICATIONS

European Search Report for Application No. 16204421.8 dated May 19, 2017.

(Continued)

*Primary Examiner* — Christopher S Kessler
(74) *Attorney, Agent, or Firm* — Workman Nydegger

(57) ABSTRACT

A three-dimensional shaped article production method according to the invention is a method for producing a three-dimensional shaped article by stacking layers formed in a predetermined pattern, wherein a series of steps including a composition supply step of supplying a composition containing a plurality of particles to a predetermined part, and a bonding step of bonding the particles by irradiation with a laser light is performed repeatedly, and the composition supply step includes a step of forming a first region using a first composition containing first particles as the composition, and a step of forming a second region using a second composition containing second particles which are different from the first particles as the composition, and the bonding of the particles in the first region and the bonding of the particles in the second region are performed by irradiation with laser lights with a different spectrum.

7 Claims, 16 Drawing Sheets

(56) References Cited

U.S. PATENT DOCUMENTS

| | | |
|---|---|---|
| 2011/0107967 A1 | 5/2011 | Hopkinson et al. |
| 2012/0228807 A1 | 9/2012 | Teulet |
| 2013/0001834 A1 | 1/2013 | El-Siblani et al. |
| 2014/0263209 A1 | 9/2014 | Burris et al. |
| 2014/0314613 A1 | 10/2014 | Hopkinson et al. |
| 2014/0361464 A1 | 12/2014 | Holcomb |
| 2015/0048075 A1* | 2/2015 | Pedrosa .............. B05D 3/0209 219/410 |
| 2015/0054204 A1 | 2/2015 | Tseliakhovich et al. |
| 2015/0241418 A1* | 8/2015 | Wolfrum ............... B82Y 40/00 428/315.5 |
| 2016/0332370 A1 | 11/2016 | Arai et al. |

FOREIGN PATENT DOCUMENTS

| | | |
|---|---|---|
| JP | 2009-001900 | 1/2009 |
| JP | 2009-007605 | 1/2009 |
| JP | 2013-505355 | 2/2013 |
| JP | 2014-518171 | 7/2014 |
| JP | 2014-527481 | 10/2014 |
| JP | 2015-081380 | 4/2015 |
| JP | 2015-139957 | 8/2015 |
| WO | 2006-024373 | 3/2006 |
| WO | 2013-003457 | 1/2013 |
| WO | 2014-131444 | 9/2014 |
| WO | 2015145844 | 10/2015 |

OTHER PUBLICATIONS

Kurzynowski et al., "Parameters in Selective Laser Melting for Processing Metallic Powders", 2012, Proc. of SPIE, vol. 8239, 823914-1, High Power Laster Materials Processing: Lasers, Beam Delivery, Diagnostics, and Applications, CCC code: 0277-786X/12/$18, doi: 10.1117/12.907292, pp. 1-6.

* cited by examiner

THREE-DIMENSIONAL SHAPED ARTICLE PRODUCTION METHOD, THREE-DIMENSIONAL SHAPED ARTICLE PRODUCTION APPARATUS, AND THREE-DIMENSIONAL SHAPED ARTICLE

BACKGROUND

1. Technical Field

The present invention relates to a three-dimensional shaped article production method, a three-dimensional shaped article production apparatus, and a three-dimensional shaped article.

2. Related Art

There has been known a method for forming a three-dimensional shaped article based on the model data of a three-dimensional object formed with, for example, a three-dimensional CAD software, a three-dimensional scanner, or the like.

As a method for forming a three-dimensional shaped article, there has been known a stacking method (three-dimensional shaping method). In the stacking method, in general, after the model data of a three-dimensional object is divided into a large number of two-dimensional cross-sectional layer data (slice data), while sequentially shaping cross-sectional members corresponding to the respective two-dimensional cross-sectional layer data, the cross-sectional members are sequentially stacked, whereby a three-dimensional shaped article is formed.

The stacking method can immediately form a three-dimensional shaped article as long as there is the model data of the three-dimensional shaped article to be shaped, and it is not necessary to form a mold prior to shaping, and therefore, it is possible to form a three-dimensional shaped article rapidly at low cost. Further, since the formation is performed by stacking the layers of thin plate-shaped cross-sectional members one by one, even in the case of a complicated object having, for example, an internal structure, the object can be formed as an integrated shaped article without being divided into a plurality of components.

As such a stacking method, there has been known a technique which includes an ejection step of ejecting a powder onto a support and a sintering step of sintering a fixed powder layer by irradiation with a laser light thereby forming a sintered layer (see, for example, JP-A-2015-81380 (Patent Document 1)).

The Patent Document 1 discloses that as the powder, a first powder and a second powder are used, and in the ejection step, these powders are ejected onto different positions, respectively, in the support.

However, in the case where powders constituted by different materials were sintered by a laser light, it was difficult to sinter both powders favorably. More specifically, in the case where both regions constituted by the respective powders are tried to be sufficiently sintered, the powders are excessively melted or the like, and therefore, a region in which undesirable deformation occurs appears, and the dimensional accuracy of the finally obtained three-dimensional shaped article is deteriorated. Further, when the excessive melting or the like of the powder is tried to be prevented, the bonding strength in a region constituted by the other powder cannot be made sufficiently high.

SUMMARY

An advantage of some aspects of the invention is to provide a three-dimensional shaped article production method capable of efficiently producing a three-dimensional shaped article having high mechanical strength and dimensional accuracy, to provide a three-dimensional shaped article production apparatus capable of efficiently producing a three-dimensional shaped article having high mechanical strength and dimensional accuracy, and to provide a three-dimensional shaped article having high mechanical strength and dimensional accuracy.

The advantage can be achieved by the following configuration.

A three-dimensional shaped article production method according to an aspect of the invention is a method for producing a three-dimensional shaped article by stacking layers formed in a predetermined pattern, including repeatedly performing a series of steps including a composition supply step of supplying a composition containing a plurality of particles to a predetermined part, and a bonding step of bonding the particles by irradiation with a laser light, in which the composition supply step includes a step of forming a first region using a first composition containing first particles as the composition, and a step of forming a second region using a second composition containing second particles which are different from the first particles as the composition, and the bonding of the particles in the first region and the bonding of the particles in the second region are performed by irradiation with laser lights with a different spectrum.

According to this configuration, a three-dimensional shaped article production method capable of efficiently producing a three-dimensional shaped article having high mechanical strength and dimensional accuracy can be provided.

In the three-dimensional shaped article production method according to the aspect of the invention, it is preferred that a region including a portion of the first region and a portion of the second region, and also includes a boundary part between the first region and the second region is irradiated with a plurality of different types of laser lights superimposed on one another.

According to this configuration, also in the vicinity of the boundary part between the first region and the second region, the energy of the laser light can be more favorably absorbed by each of the first region and the second region, and thus, the particles can be more favorably bonded to each other. As a result, the mechanical strength and dimensional accuracy of the three-dimensional shaped article can be further increased.

In the three-dimensional shaped article production method according to the aspect of the invention, it is preferred that at least one of the first composition and the second composition contains a solvent for dispersing the particles.

According to this configuration, the fluidity or flowability of the composition is improved, and the composition can be easily applied, and thus, the productivity of the three-dimensional shaped article can be further increased.

In the three-dimensional shaped article production method according to the aspect of the invention, it is preferred that the series of steps includes a solvent removal step of removing the solvent between the composition supply step and the bonding step.

According to this configuration, the productivity of the three-dimensional shaped article can be further increased. Further, undesirable deformation of a layer due to, for example, abrupt volatilization (bumping or the like) of the solvent or the like in the bonding step can be more effectively prevented, and therefore, the dimensional accuracy of the three-dimensional shaped article can be more reliably increased.

In the three-dimensional shaped article production method according to the aspect of the invention, it is preferred that the first particles contain at least one member selected from the group consisting of magnesium, iron, copper, cobalt, titanium, chromium, aluminum, a maraging steel, stainless steel, cobalt-chrome-molybdenum, a titanium alloy, a nickel alloy, an aluminum alloy, a cobalt alloy, a magnesium alloy, and a cobalt-chromium alloy, and the second particles contain at least one member selected from the group consisting of alumina, silica, zirconia, silicon carbide, and silicon nitride.

These substances have greatly different physical properties, and by using these substances in combination, for example, the three-dimensional shaped article can be obtained as an article constituted by a composite material of these substances, and thus can exhibit excellent properties as a whole. Further, the light absorption spectra of these substances are mutually greatly different from each other, and in the case where bonding of the particles is tried to be performed using a single type of laser light, a problem such that a sufficient bonding strength cannot be obtained, the dimensional accuracy is deteriorated, or the like particularly remarkably occurs. On the other hand, in the aspect of the invention, even in the case where materials having a greatly different light absorption spectrum are used in combination, a sufficient bonding strength can be obtained while preventing undesirable deformation in the respective regions. That is, in the case of using particles constituted by the materials as described above in combination, the effect of the invention is more remarkably exhibited.

In the three-dimensional shaped article production method according to the aspect of the invention, it is preferred that the bonding of the first particles is performed using a laser light with a maximum peak wavelength within a range of 0.5 μm or more and 2.0 μm or less, and the bonding of the second particles is performed using a laser light with a maximum peak wavelength within a range of 7.0 μm or more and 15 μm or less.

According to this configuration, the energy of the laser light can be more favorably absorbed by each of the first region and the second region, and thus, the particles can be more favorably bonded to each other. As a result, the mechanical strength and dimensional accuracy of the three-dimensional shaped article can be further increased.

A three-dimensional shaped article production apparatus according to an aspect of the invention includes a composition supply unit which supplies a composition containing a plurality of particles to a predetermined part, and a laser light irradiation unit which irradiates the composition with a laser light, wherein as the composition supply unit, a first composition supply unit which supplies a first composition containing a plurality of first particles to a predetermined part, and a second composition supply unit which supplies a second composition containing a plurality of second particles to a predetermined part are included, in which the laser light irradiation unit is configured such that the spectra of the laser lights to be irradiated are different between the first region to which the first composition is supplied and the second region to which the second composition is supplied.

According to this configuration, a three-dimensional shaped article production apparatus capable of efficiently producing a three-dimensional shaped article having high mechanical strength and dimensional accuracy can be provided.

A three-dimensional shaped article according to an aspect of the invention is produced using the three-dimensional shaped article production apparatus or method according to the aspects of the invention.

According to this configuration, a three-dimensional shaped article having high mechanical strength and dimensional accuracy can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments will be described in detail with reference to the accompanying drawings.

Three-Dimensional Shaped Article Production Method

First, a three-dimensional shaped article production method according to the invention will be described.

First Embodiment

Figure 9:
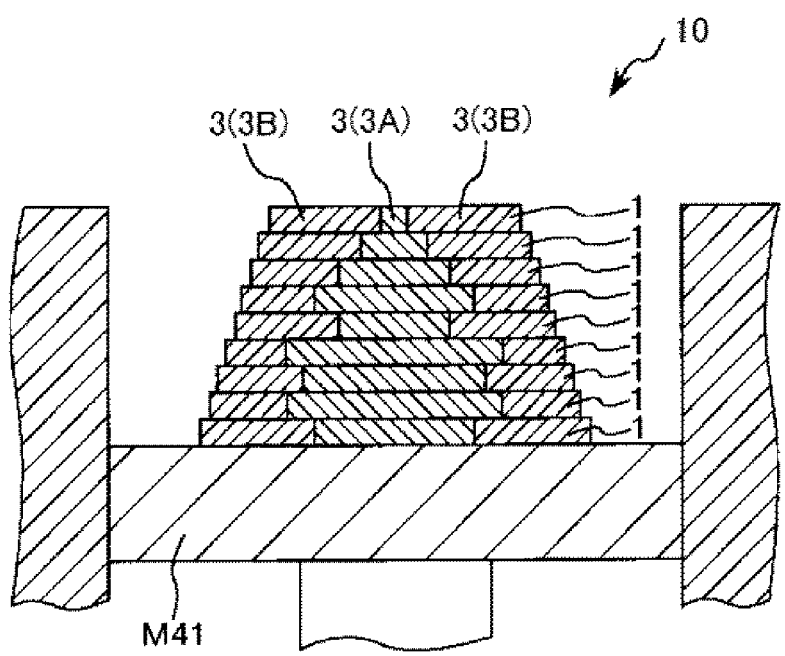
FIG. 9 is a vertical cross-sectional view schematically showing a step in the first embodiment of the three-dimensional shaped article production method according to the invention.
Figure 10:
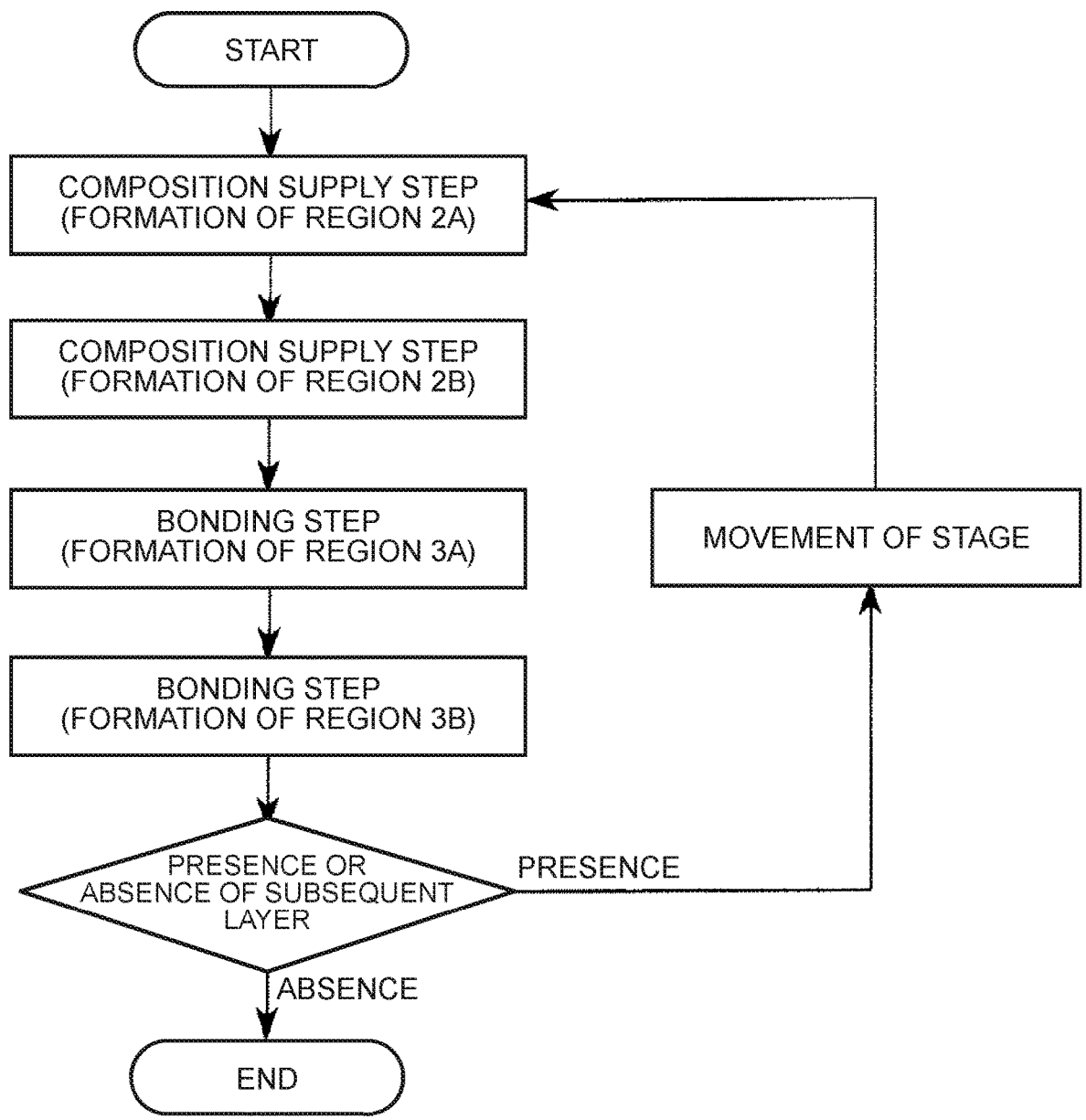
FIG. 10 is a flowchart showing the first embodiment of the three-dimensional shaped article production method according to the invention.
Figure 11:
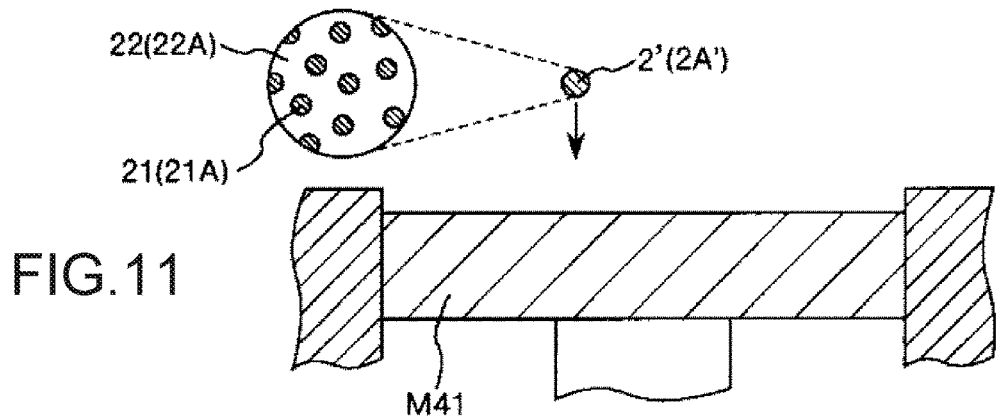
FIG. 11 is a vertical cross-sectional view schematically showing a step in a second embodiment of the three-dimensional shaped article production method according to the invention.
Figure 12:
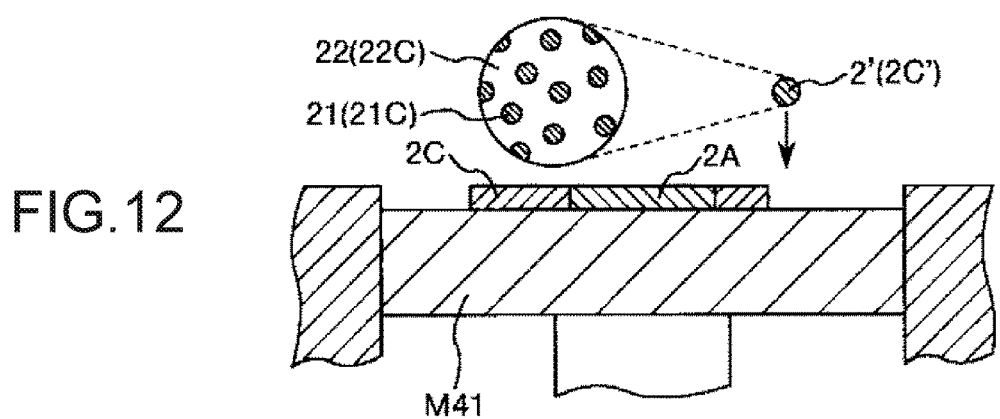
FIG. 12 is a vertical cross-sectional view schematically showing a step in the second embodiment of the three-dimensional shaped article production method according to the invention.
Figure 13:
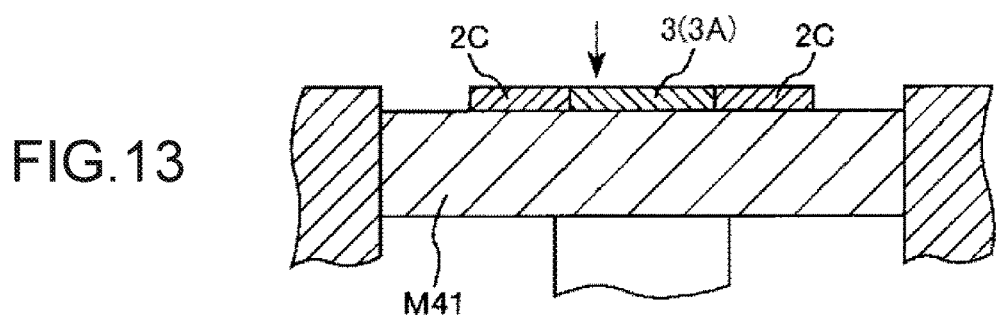
FIG. 13 is a vertical cross-sectional view schematically showing a step in the second embodiment of the three-dimensional shaped article production method according to the invention.
Figure 14:
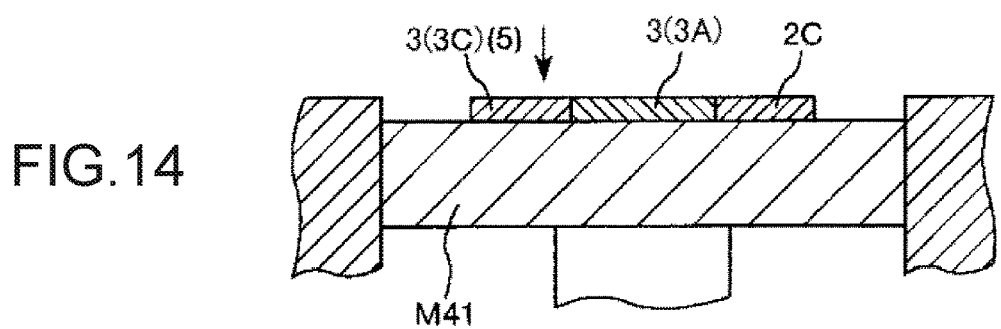
FIG. 14 is a vertical cross-sectional view schematically showing a step in the second embodiment of the three-dimensional shaped article production method according to the invention.
Figure 15:
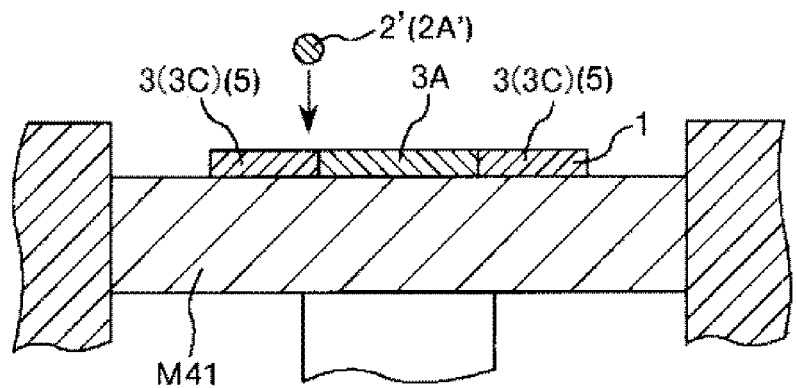
FIG. 15 is a vertical cross-sectional view schematically showing a step in the second embodiment of the three-dimensional shaped article production method according to the invention.
Figure 16:
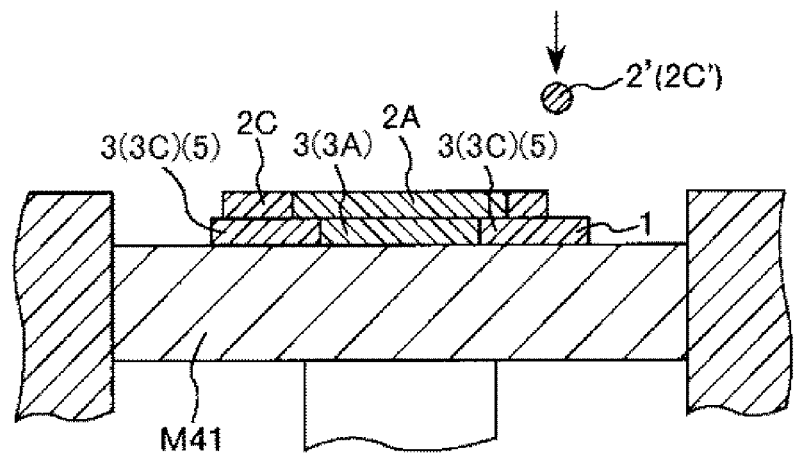
FIG. 16 is a vertical cross-sectional view schematically showing a step in the second embodiment of the three-dimensional shaped article production method according to the invention.
Figure 17:
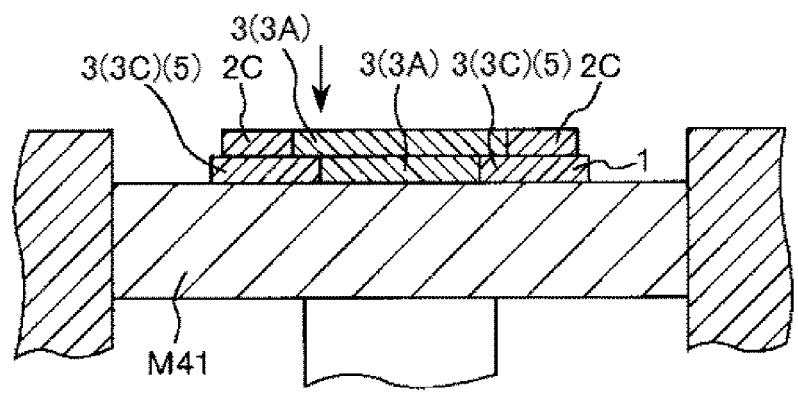
FIG. 17 is a vertical cross-sectional view schematically showing a step in the second embodiment of the three-dimensional shaped article production method according to the invention.
Figure 18:
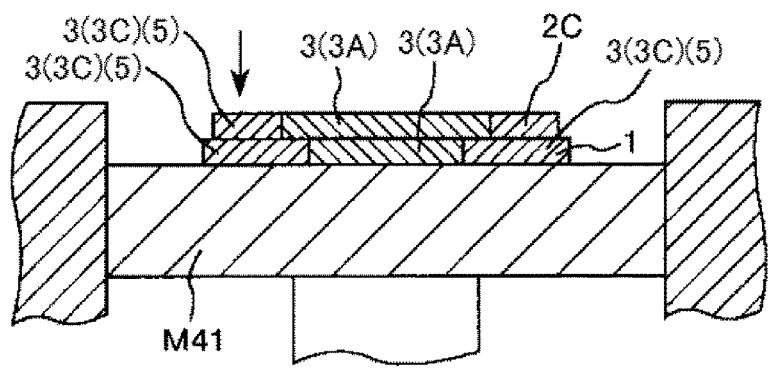
FIG. 18 is a vertical cross-sectional view schematically showing a step in the second embodiment of the three-dimensional shaped article production method according to the invention.
Figure 19:
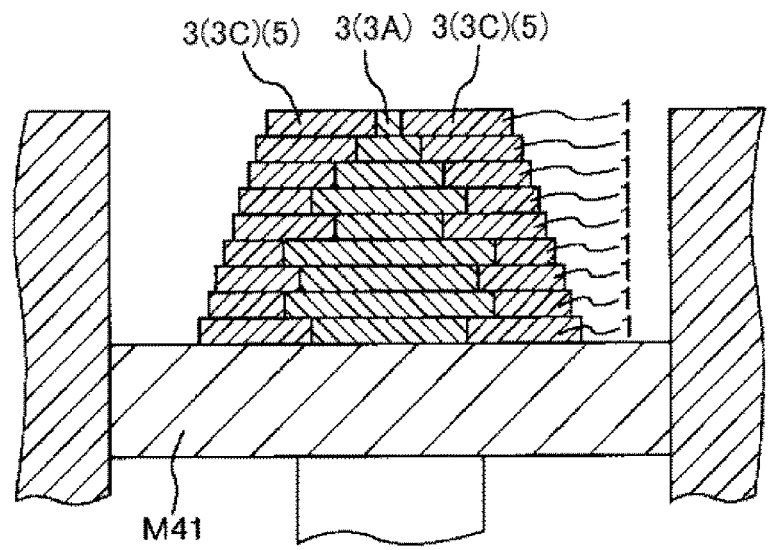
FIG. 19 is a vertical cross-sectional view schematically showing a step in the second embodiment of the three-dimensional shaped article production method according to the invention.

FIGS. 1 to 9 are vertical cross-sectional views schematically showing steps in the first embodiment of the three-dimensional shaped article production method according to the invention, and FIG. 10 is a flowchart showing the first embodiment of the three-dimensional shaped article production method according to the invention.

As shown in FIGS. 1 to 9, and 10, the production method for a three-dimensional shaped article 10 of this embodiment is a method for producing a three-dimensional shaped article 10 by stacking a plurality of layers 1, and includes a composition supply step (see FIGS. 1, 2, 5, and 6) of supplying a composition 2' containing a plurality of particles 21 to a predetermined part, and a bonding step (see FIGS. 3, 4, 7, and 8) of bonding the particles 21 by irradiation with a laser light, thereby forming a bonded part 3, and a series of steps including these steps is performed repeatedly (see FIG. 9).

Then, in the composition supply step, a region 2A is formed using a composition 2A' containing particles 21A as the composition 2', and also a region 2B is formed using a composition 2B' containing particles 21B which are different from the particles 21A as the composition 2'.

In the bonding step, the bonding of the particles 21A in the region 2A and the bonding of the particles 21B in the region 2B are performed by irradiation with laser lights with a different spectrum.

In other words, in the composition supply step, a first region is formed using a first composition containing first particles as the composition, and a second region is formed using a second composition containing second particles which are different from the first particles as the composition, and in the bonding step, the bonding of the particles in the first region and the bonding of the particles in the second region are performed by irradiation with laser lights with a different spectrum.

In this manner, in the bonding of the particles, by irradiating the first region and the second region with laser lights with a mutually different spectrum, the irradiation with a laser light can be performed under appropriate conditions depending on the type of particles contained in the respective regions (the first region and the second region), and therefore, while favorably preventing undesirable deformation or the like due to excessive melting of the particles or the like, the bonding strength between the particles can be increased. As a result, a three-dimensional shaped article having high mechanical strength and dimensional accuracy can be efficiently produced.

On the other hand, in the case where the respective regions are irradiated with a laser light with the same spectrum, when the bonding of the particles in the respective regions is tried to be made to sufficiently proceed, undesirable deformation due to excessive melting of the particles or the like is likely to occur in a predetermined region, and further, when the excessive melting of the particles or the like is tried to be prevented, a region in which the bonding strength between the particles is insufficient appears.

It is also considered that the irradiation energy amount of the laser light in the respective parts is adjusted by adjusting the output of the laser or the irradiation time of the laser light in the respective parts, however, in such a case, it is difficult to absorb the energy of the laser light throughout the region with a high absorption ratio, and much energy goes to waste, and thus, the productivity of the three-dimensional shaped article becomes poor. Further, in the case where in the vicinity or the like of the boundary of a plurality of regions constituted by different materials, the particles constituting one region are tried to be bonded with a sufficient strength, the particles constituting the other region are excessively melted or the like, so that undesirable deformation occurs, and thus, the dimensional accuracy of the three-dimensional shaped article is deteriorated. Further, in a part to which excessive energy is applied, the material constituting the particles is denatured, and therefore, the three-dimensional shaped article which does not have desired physical properties may sometimes be formed. Incidentally, the "vicinity of the boundary" includes a range having a diameter which is twice as large as the laser diameter from the center of the laser irradiation region including the range of the irradiation diameter of the laser light.

The first particles and the second particles may have any relationship as long as they are mutually different from each other, however, in the following description, a case where the second particles are constituted by a material having a higher melting point than that of the constituent material of the first particles will be mainly described.

Hereinafter, the respective steps will be described in detail.

Composition Supply Step

In the composition supply step, a composition 2' containing a plurality of particles 21 and a dispersion medium 22 for dispersing the particles (dispersoids) 21 is supplied to a predetermined part (a part corresponding to a bonded part 3 to be formed) (see FIGS. 1, 2, 5, and 6).

In particular, in this embodiment, a mutually different composition 2' is applied to a region to become an actual body part of a three-dimensional shaped article 10. That is, in this embodiment, in the composition supply step, a composition (an actual body part forming composition) 2A' (a composition 2A' obtained by dispersing particles 21A in a dispersion medium 22A) is supplied to a predetermined part (see FIGS. 1 and 5) to form a region 2A, and also supplying a composition (an actual body part forming composition) 2B' (a composition 2B' obtained by dispersing particles 21B in a dispersion medium 22B) is supplied to a predetermined part which is different from the part to which the composition 2A' is supplied to form a region 2B (see FIGS. 2 and 6).

By doing this, for example, the three-dimensional shaped article 10 can be produced as an article having parts constituted by different materials, and the three-dimensional shaped article 10 having properties (including appearance, functionality, etc.) suitable for the respective parts can be obtained, and thus, the properties of the three-dimensional shaped article 10 as a whole can be improved.

Figure 1:
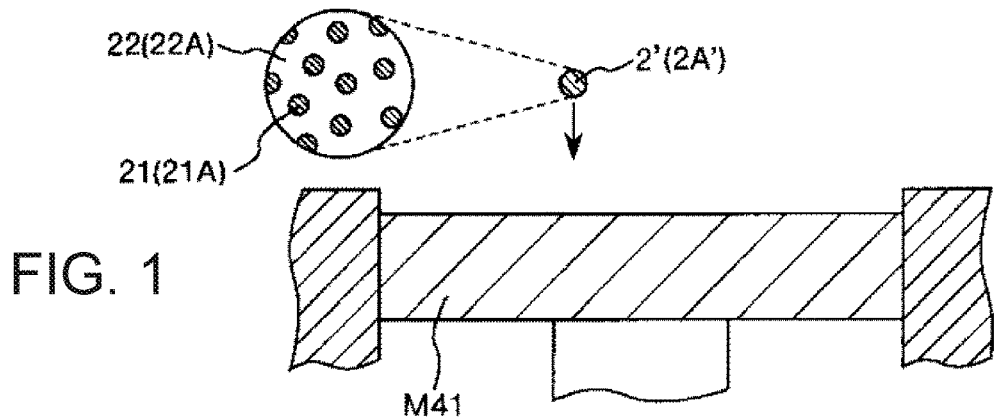
FIG. 1 is a vertical cross-sectional view schematically showing a step in a first embodiment of a three-dimensional shaped article production method according to the invention.
Figure 2:
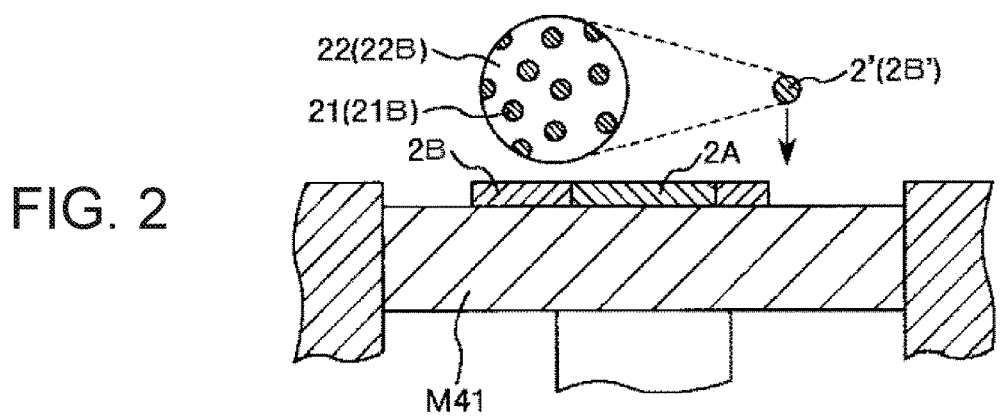
FIG. 2 is a vertical cross-sectional view schematically showing a step in the first embodiment of the three-dimensional shaped article production method according to the invention.
Figure 3:
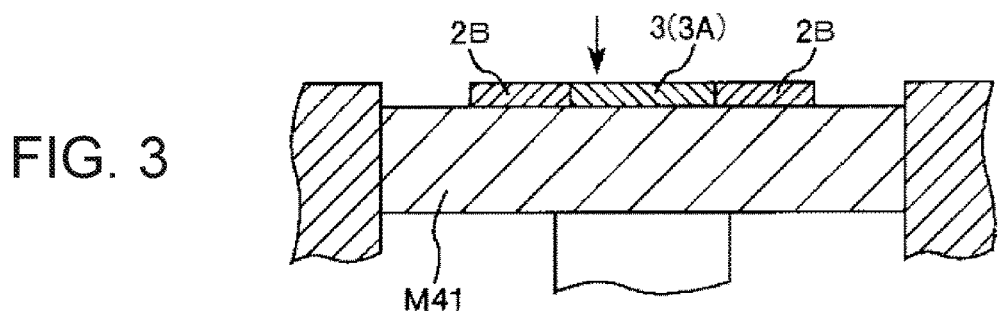
FIG. 3 is a vertical cross-sectional view schematically showing a step in the first embodiment of the three-dimensional shaped article production method according to the invention.
Figure 4:
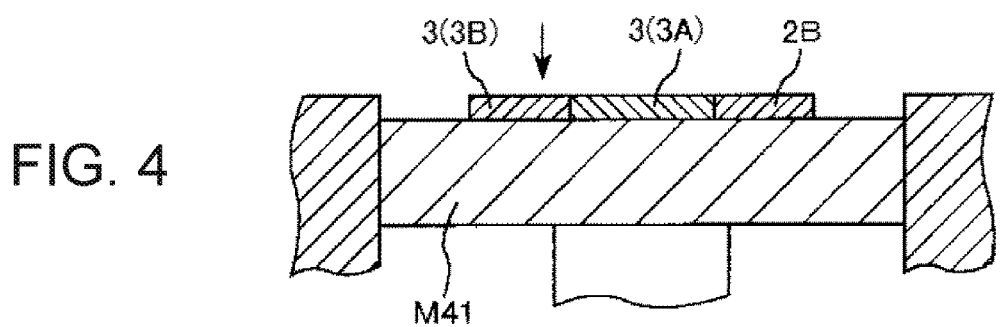
FIG. 4 is a vertical cross-sectional view schematically showing a step in the first embodiment of the three-dimensional shaped article production method according to the invention.
Figure 5:
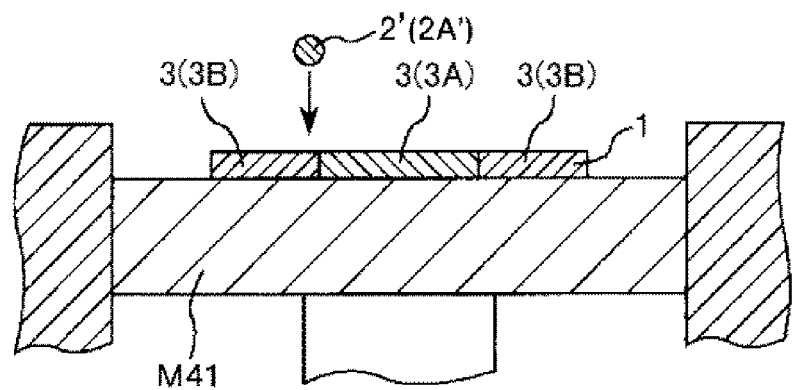
FIG. 5 is a vertical cross-sectional view schematically showing a step in the first embodiment of the three-dimensional shaped article production method according to the invention.
Figure 6:
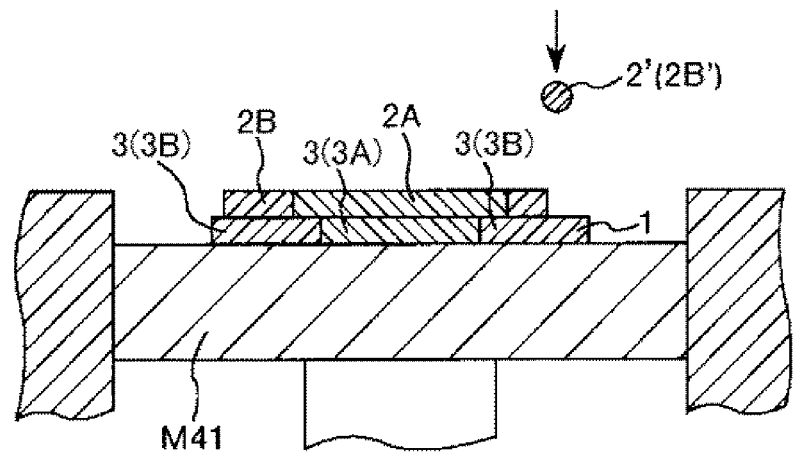
FIG. 6 is a vertical cross-sectional view schematically showing a step in the first embodiment of the three-dimensional shaped article production method according to the invention.
Figure 7:
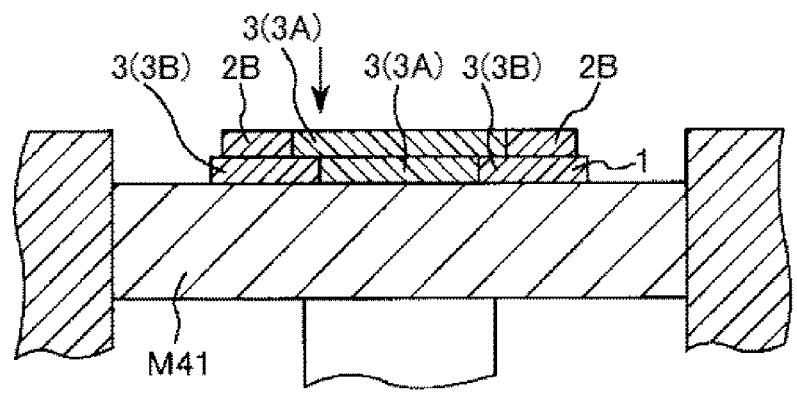
FIG. 7 is a vertical cross-sectional view schematically showing a step in the first embodiment of the three-dimensional shaped article production method according to the invention.
Figure 8:
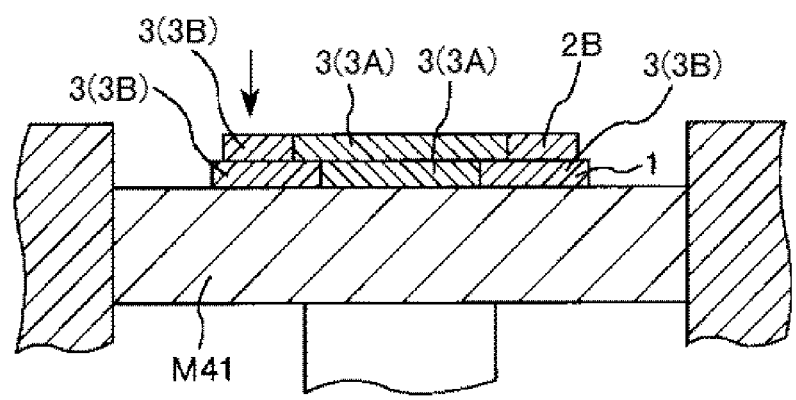
FIG. 8 is a vertical cross-sectional view schematically showing a step in the first embodiment of the three-dimensional shaped article production method according to the invention.

In the composition supply step to be performed a plurality of times, in the composition supply step of supplying the compositions 2' (the composition 2A' and the composition 2B') to be used for forming a layer 1 of the first layer, the compositions 2' are supplied in a predetermined pattern toward the surface of a stage (support) M41 (see FIGS. 1 and 2), and in the composition supply step of supplying the compositions 2' to be used for forming a layer 1 of the second layer or thereafter, the compositions 2' are supplied in a predetermined pattern toward the layer 1 having a bonded part 3 previously formed using the compositions 2' (see FIGS. 5 and 6). That is, in the composition supply step of supplying the compositions 2' to be used for forming the layer 1 of the first layer, the stage (support) M41 serves as an adherend of the compositions 2' (see FIGS. 1 and 2), and in the composition supply step of supplying the compositions 2' to be used for forming the layer 1 of the second layer or thereafter, the previously formed layer 1 serves as an adherend of the compositions 2' (see FIGS. 5 and 6).

The composition 2' may be any as long as it contains at least the particles 21, but is preferably a composition containing a solvent (dispersion medium) for dispersing the particles 21.

According to this, the fluidity of the composition 2' is improved, so that the composition can be easily applied, and thus, the productivity of the three-dimensional shaped article can be further increased.

The effect as described above can be obtained as long as at least one of the composition 2A' and the composition 2B' contains a solvent for dispersing the particles 21, however, it is preferred that all the compositions 2' (the composition 2A' and the composition 2B') to be used for producing the three-dimensional shaped article 10 contain a solvent.

According to this, the effect as described above is more remarkably exhibited.

The composition 2' is preferably a composition in the form of a paste.

The viscosity of the composition 2' to be supplied to a predetermined part in this step is preferably 1000 mPa·s or more and 50000 mPa·s or less, more preferably 5000 mPa·s or more and 20000 mPa·s or less.

According to this, for example, the ejection stability of the composition 2' can be further increased, and thus, the productivity of the three-dimensional shaped article 10 can be further increased. Further, the occurrence of undesirable deformation after the composition 2' comes into contact with the target part can be more effectively prevented, and therefore, the dimensional accuracy of the finally obtained three-dimensional shaped article 10 can be further increased.

Incidentally, unless otherwise specified, the "viscosity" as used herein refers to a value measured using an E-type viscometer (for example, VISCONIC ELD, manufactured by Tokyo Keiki, Inc. or the like).

The composition 2' will be described in detail later.

The supply (ejection) of the composition 2' can be performed using, for example, any of various types of ejection devices such as inkjet devices and various types of dispensers, however, in this step, it is preferred that the composition 2' is ejected as a plurality of droplets to form a predetermined pattern.

According to this, the composition 2' can be more favorably applied also to, for example, the production of the three-dimensional shaped article 10 having a fine structure, and the dimensional accuracy of the three-dimensional shaped article 10 can be further increased. In addition, the waste of the material can be suppressed.

In the case where the composition 2' is ejected as a plurality of droplets in this step, the volume of one droplet of the composition 2' to be ejected is preferably 1 pL or more and 100 pL or less, more preferably 2 pL or more and 80 pL or less.

According to this, the composition 2' can be more favorably applied also to, for example, the production of the three-dimensional shaped article 10 having a fine structure, and the dimensional accuracy of the three-dimensional shaped article 10 can be further increased and also the productivity of the three-dimensional shaped article 10 can be further increased.

In the case where the composition 2' to be used in the composition supply step contains a volatile solvent, prior to the bonding step, which will be described in detail later, a solvent removal step for removing the solvent may be performed.

According to this, the productivity of the three-dimensional shaped article 10 can be further increased. Further, undesirable deformation of the layer 1 due to, for example, abrupt volatilization (bumping or the like) of the solvent or the like in the bonding step can be more effectively prevented, and therefore, the dimensional accuracy of the three-dimensional shaped article 10 can be more reliably increased.

In the case where the solvent removal step is performed, this step can be performed by, for example, a heating treatment or a depressurization treatment.

Even in the case where the solvent removal step is performed, it is not necessary to completely remove the solvent from the pattern (the pattern formed by the composition 2') to be subjected to the bonding step. Even in such a case, the remaining solvent can be removed by energy to be applied in the bonding step.

Bonding Step

A laser light is scanned (irradiated) on the patterns (regions 2A and 2B) formed using the compositions 2' (see FIGS. 3, 4, 7, and 8).

According to this, the particles 21 contained in the composition 2' are bonded to each other, whereby a bonded part 3 is formed. In this manner, by forming the bonded part 3, undesirable movement of the particles 21 thereafter is prevented, and the dimensional accuracy of the three-dimensional shaped article 10 can be increased. Further, in the thus formed bonded part 3, in general, the particles 21 are bonded to each other with a sufficient bonding strength. Further, in this step, in the case where the layer 1 in which the bonded part 3 is formed is located on the lower side of the pattern (region) to be irradiated with a laser light, in general, the bonded part 3 in the layer 1 on the lower side and the bonded part 3 to be newly formed are bonded to each other. Due to this, the mechanical strength of the finally obtained three-dimensional shaped article 10 can be increased.

Further, by using a laser light, energy can be applied to a desired part with high selectivity, and therefore, it is advantageous not only for increasing the dimensional accuracy of the three-dimensional shaped article 10, but also for improving the productivity of the three-dimensional shaped article 10. Further, the energy efficiency can be increased, and therefore, it is also advantageous from the viewpoint of energy saving.

In this step, by the irradiation with a laser light, the particles 21 are bonded to each other, and also unnecessary components other than the particles 21 can be removed. For example, a binder, the solvent, and the like can be removed, and these components can be effectively prevented from remaining in the bonded part 3 to be formed.

The form of bonding varies depending on the constituent material or the like of the particles 21, however, for example, fusion, sintering, melt-solidification, and the like can be exemplified.

The respective regions formed by applying the compositions 2' in the composition supply step become the corresponding respective regions constituting the bonded parts 3 in the bonding step. That is, in this step, the region 2A becomes a region 3A (see FIGS. 3 and 7), and the region 2B becomes a region 3B (see FIGS. 4 and 8).

Then, as described above, in this step, the bonding of the particles 21A in the region 2A and the bonding of the particles 21B in the region 2B are performed by irradiation with laser lights with a different spectrum.

According to this, while favorably preventing undesirable deformation or the like due to excessive melting of the particles 21 or the like, the bonding strength between the particles 21 can be increased. As a result, the three-dimensional shaped article 10 having high mechanical strength and dimensional accuracy can be efficiently produced.

The spectrum of the laser light can be determined, for example, according to the absorption spectrum of the constituent material of the particles 21 to be irradiated with the laser light or the like.

For example, the spectrum of the laser light to be irradiated on a region containing the particles 21 made of Al has a maximum peak wavelength within a range of preferably 0.4 µm or more and 2.0 µm or less, more preferably 0.45 µm or more and 1.8 µm or less, further more preferably 0.5 µm or more and 1.6 µm or less.

The spectrum of the laser light to be irradiated on a region containing the particles 21 made of Cu has a maximum peak wavelength within a range of preferably 0.05 µm or more and 0.6 µm or less, more preferably 0.1 µm or more and 0.5 µm or less, further more preferably 0.2 µm or more and 0.4 µm or less.

The spectrum of the laser light to be irradiated on a region containing the particles 21 made of Cr has a maximum peak wavelength within a range of preferably 0.2 µm or more and 2.0 µm or less, more preferably 0.25 µm or more and 1.5 µm or less, further more preferably 0.3 µm or more and 1.3 µm or less.

The spectrum of the laser light to be irradiated on a region containing the particles 21 made of Fe has a maximum peak wavelength within a range of preferably 0.3 µm or more and 1.8 μm or less, more preferably 0.35 μm or more and 1.5 μm or less, further more preferably 0.4 μm or more and 1.3 μm or less.

The spectrum of the laser light to be irradiated on a region containing the particles 21 made of an Fe alloy has a maximum peak wavelength within a range of preferably 0.3 μm or more and 1.8 μm or less, more preferably 0.35 μm or more and 1.5 μm or less, further more preferably 0.4 μm or more and 1.3 μm or less.

The spectrum of the laser light to be irradiated on a region containing the particles 21 made of Ti has a maximum peak wavelength within a range of preferably 0.4 μm or more and 2.5 μm or less, more preferably 0.5 μm or more and 2.4 μm or less, further more preferably 0.6 μm or more and 2.0 μm or less.

The spectrum of the laser light to be irradiated on a region containing the particles 21 made of alumina ($Al_2O_3$) has a maximum peak wavelength within a range of preferably 2.0 μm or more and 15 μm or less, more preferably 2.5 μm or more and 12 μm or less, further more preferably 5.0 μm or more and 11 μm or less.

The spectrum of the laser light to be irradiated on a region containing the particles 21 made of silicon nitride ($Si_3N_4$) has a maximum peak wavelength within a range of preferably 2.0 μm or more and 15 μm or less, more preferably 7 μm or more and 14 μm or less, further more preferably 10 μm or more and 13 μm or less.

The spectrum of the laser light to be irradiated on a region containing the particles 21 made of silicon carbide (SiC) has a maximum peak wavelength within a range of preferably 0.1 μm or more and 4.0 μm or less, more preferably 0.15 μm or more and 3.0 μm or less, furthermore preferably 0.2 μm or more and 2.5 μm or less.

The spectrum of the laser light to be irradiated on a region containing the particles 21 made of silicon dioxide ($SiO_2$) has a maximum peak wavelength within a range of preferably 3.0 μm or more and 15 μm or less, more preferably 5 μm or more and 11 μm or less, further more preferably 6 μm or more and 10 μm or less.

The spectrum of the laser light to be irradiated on a region containing the particles 21 made of titanium dioxide ($TiO_2$) has a maximum peak wavelength within a range of preferably 0.2 μm or more and 0.6 μm or less, more preferably 0.3 μm or more and 0.5 μm or less, further more preferably 0.35 μm or more and 0.4 μm or less.

The spectrum of the laser light to be irradiated on a region containing the particles 21 made of zirconia ($ZrO_2$) (including zirconia doped with $Y_2O_3$)) has a maximum peak wavelength within a range of preferably 10 μm or more and 60 μm or less, more preferably 14 μm or more and 50 μm or less, further more preferably 17 μm or more and 40 μm or less.

It is preferred that the peak wavelength of the laser light to be irradiated on a region containing the first particles and the peak wavelength of the laser light to be irradiated on a region containing the second particles are sufficiently separated from each other.

Specifically, when the peak wavelength of the laser light to be irradiated on a region containing the first particles is represented by $\lambda 1$ [μm] and the peak wavelength of the laser light to be irradiated on a region containing the second particles is represented by $\lambda 2$ [μm], $\lambda 1$ and $\lambda 2$ preferably satisfy the following relationship: $0.1 \leq |\lambda 1 - \lambda 2|$, more preferably satisfy the following relationship: $0.2 \leq |\lambda 1 - \lambda 2|$, further more preferably satisfy the following relationship: $0.3 \leq |\lambda 1 - \lambda 2|$.

According to this, the energy of the laser light can be more favorably absorbed by each of the first region and the second region, and thus, the particles can be more favorably bonded to each other. As a result, the mechanical strength and dimensional accuracy of the three-dimensional shaped article can be further increased.

In particular, it is preferred that the bonding of the first particles is performed using a laser light having a maximum peak wavelength within a range of 0.5 μm or more and 2.0 μm or less, and the bonding of the second particles is performed using a laser light having a maximum peak wavelength within a range of 7.0 μm or more and 15 μm or less.

According to this, the energy of the laser light can be more favorably absorbed by each of the first region and the second region, and thus, the particles can be more favorably bonded to each other. As a result, the mechanical strength and dimensional accuracy of the three-dimensional shaped article can be further increased.

When the peak wavelength of the laser light to be irradiated on a region containing the first particles is represented by $\lambda 1$ [μm], a difference between the absorption ratio of the light with a wavelength of $\lambda 1$ of the constituent material of the first particles and the absorption ratio of the light with a wavelength of $\lambda 1$ of the constituent material of the second particles is preferably 10% or more, more preferably 20% or more, further more preferably 30% or more.

According to this, the energy of the laser light can be more favorably absorbed by each of the first region and the second region, and thus, the particles can be more favorably bonded to each other. As a result, the mechanical strength and dimensional accuracy of the three-dimensional shaped article can be further increased.

When the peak wavelength of the laser light to be irradiated on a region containing the second particles is represented by $\lambda 2$ [μm], a difference between the absorption ratio of the light with a wavelength of $\lambda 1$ of the constituent material of the second particles and the absorption ratio of the light with a wavelength of $\lambda 2$ of the constituent material of the first particles is preferably 10% or more, more preferably 20% or more, further more preferably 30% or more.

According to this, the energy of the laser light can be more favorably absorbed by each of the first region and the second region, and thus, the particles can be more favorably bonded to each other. As a result, the mechanical strength and dimensional accuracy of the three-dimensional shaped article can be further increased.

Further, a region including a portion of the first region and a portion of the second region, and also includes a boundary part between the first region and the second region (hereinafter also referred to as "boundary region") may be irradiated with a plurality of different types of laser lights superimposed on one another. More specifically, for example, the first region (provided that a part included in the boundary region is excluded) is irradiated with a laser light (maximum peak wavelength: $\lambda 1$ [μm]) emitted from a first laser light source, the second region (provided that a part included in the boundary region is excluded) is irradiated with a laser light (maximum peak wavelength: $\lambda 2$ [μm]) emitted from a second laser light source, and the boundary region may be irradiated with the light emitted from the first laser light source and the light emitted from the second laser light source such that the lights are superimposed on each other.

According to this, also in the vicinity of the boundary part between the first region and the second region, the energy of the laser light can be more favorably absorbed by each of the first region and the second region, and thus, the particles can be more favorably bonded to each other. As a result, the mechanical strength and dimensional accuracy of the three-dimensional shaped article can be further increased.

Examples of the laser which can be used in this step include solid lasers such as a ruby laser, a YAG laser, an Nd:YAG laser, a titanium-sapphire laser, and a semiconductor laser; liquid lasers such as a dye laser; gas lasers such as neutral atom lasers (such as a helium-neon laser), ion lasers (such as an argon ion laser), molecular lasers (such as a carbon dioxide laser and a nitrogen laser), an excimer laser, and metal vapor lasers (such as a helium-cadmium laser); a free electron laser; chemical lasers such as an oxygen-iodine chemical laser and a hydrogen fluoride laser; and a fiber laser.

The thickness of the layer 1 having the bonded part 3 is not particularly limited, but is preferably 10 μm or more and 500 μm or less, more preferably 20 μm or more and 250 μm or less.

According to this, while increasing the productivity of the three-dimensional shaped article 10, the dimensional accuracy of the three-dimensional shaped article 10 can be further increased.

By repeatedly performing a series of steps as described above, the three-dimensional shaped article 10 is obtained (FIG. 9).

The three-dimensional shaped article production method as described above is summarized in a flowchart as shown in FIG. 10.

Incidentally, with respect to the configuration shown in the drawing, a case where the above-mentioned respective steps are performed sequentially has been described for facilitating the understanding, however, different steps may be performed simultaneously in the respective parts in the shaping region (a space on the stage).

Further, with respect to the configuration shown in the drawings, a case where one layer 1 is formed by performing the above-mentioned series of steps once has been described, however, the above-mentioned series of steps may be performed repeatedly for forming one layer. For example, one layer may be formed by performing the composition supply step and the bonding step for the composition 2A', and thereafter performing the composition supply step and the bonding step for the composition 2B'.

Second Embodiment

Next, a three-dimensional shaped article production method according to a second embodiment will be described.

Figure 20:
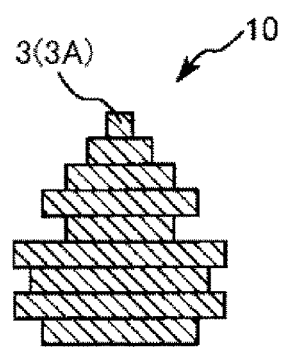
FIG. 20 is a vertical cross-sectional view schematically showing a step in the second embodiment of the three-dimensional shaped article production method according to the invention.
Figure 21:
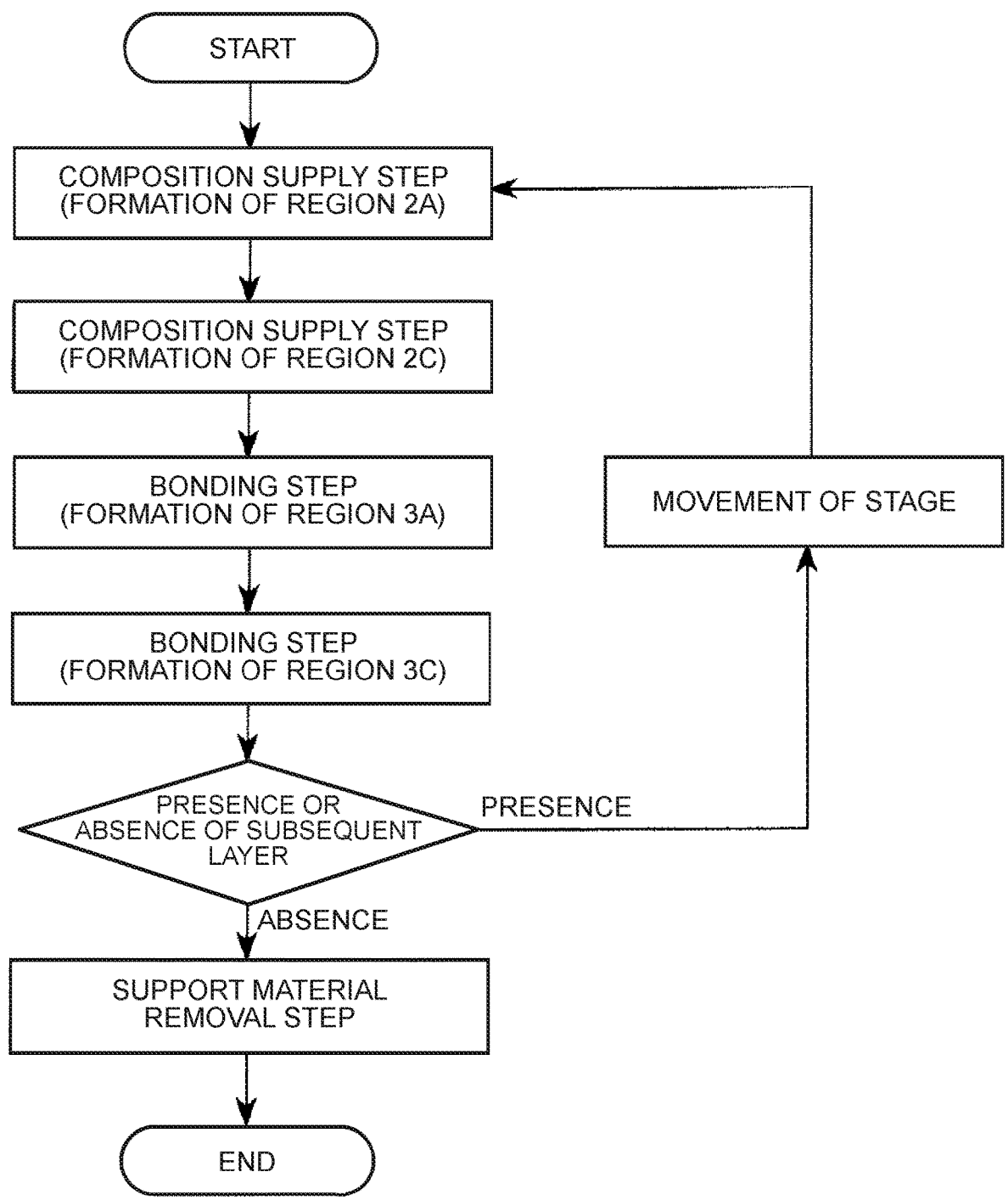
FIG. 21 is a flowchart showing the second embodiment of the three-dimensional shaped article production method according to the invention.
Figure 22:
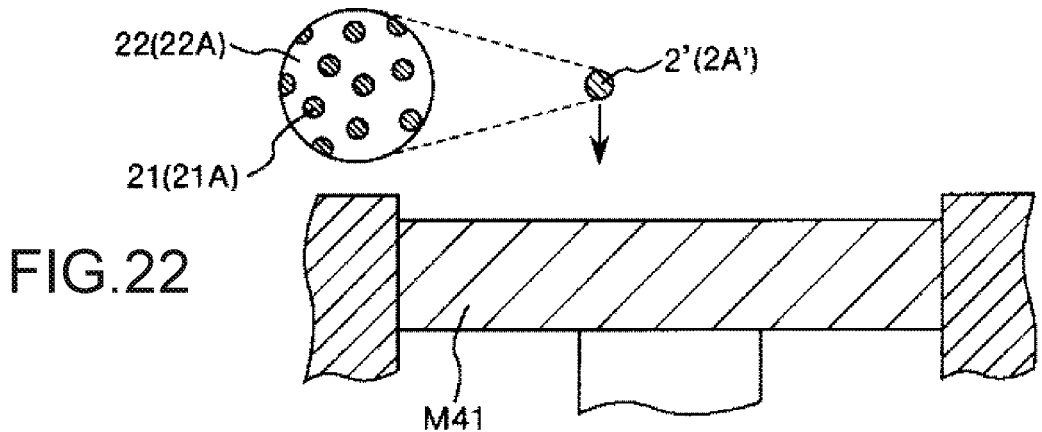
FIG. 22 is a vertical cross-sectional view schematically showing a step in a third embodiment of the three-dimensional shaped article production method according to the invention.
Figure 23:
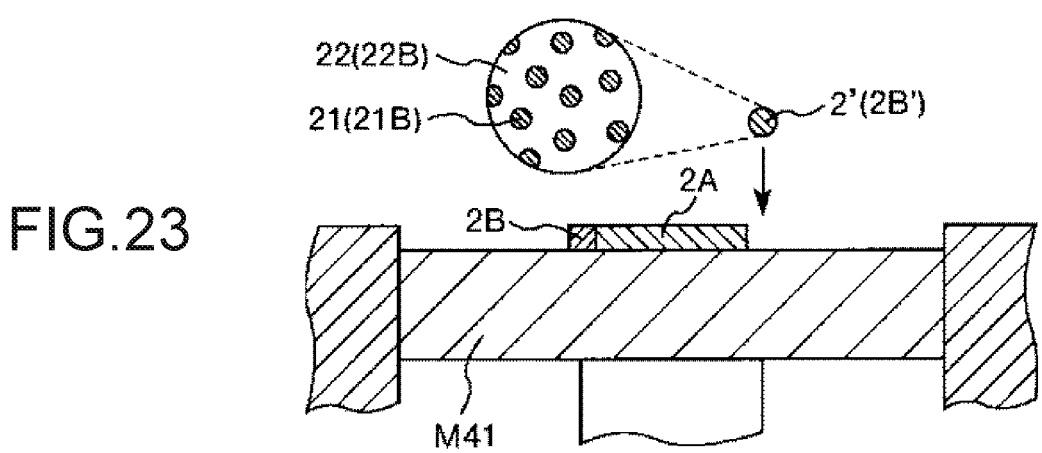
FIG. 23 is a vertical cross-sectional view schematically showing a step in the third embodiment of the three-dimensional shaped article production method according to the invention.
Figure 24:
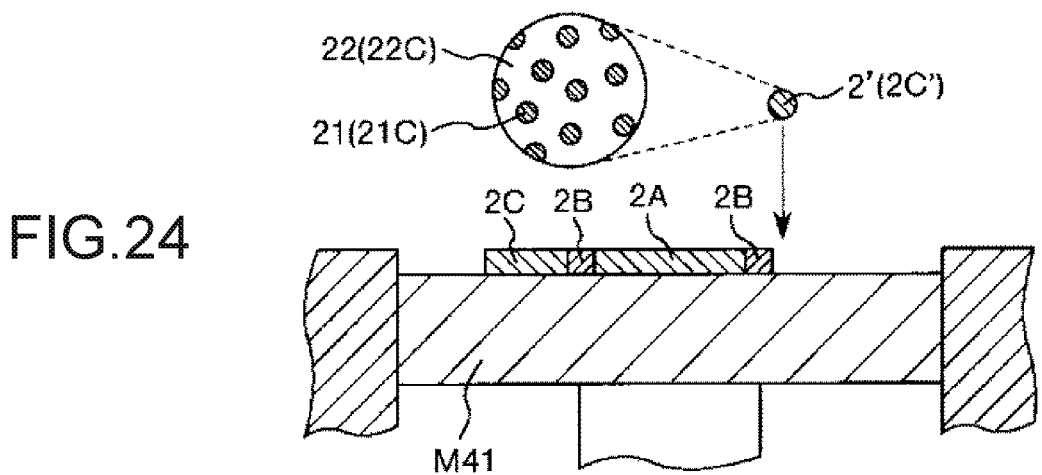
FIG. 24 is a vertical cross-sectional view schematically showing a step in the third embodiment of the three-dimensional shaped article production method according to the invention.
Figure 25:
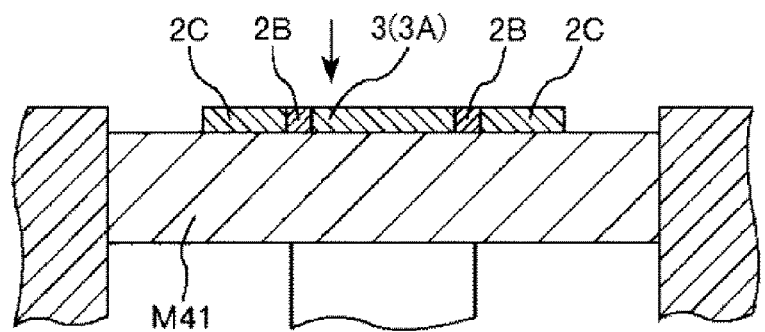
FIG. 25 is a vertical cross-sectional view schematically showing a step in the third embodiment of the three-dimensional shaped article production method according to the invention.
Figure 26:
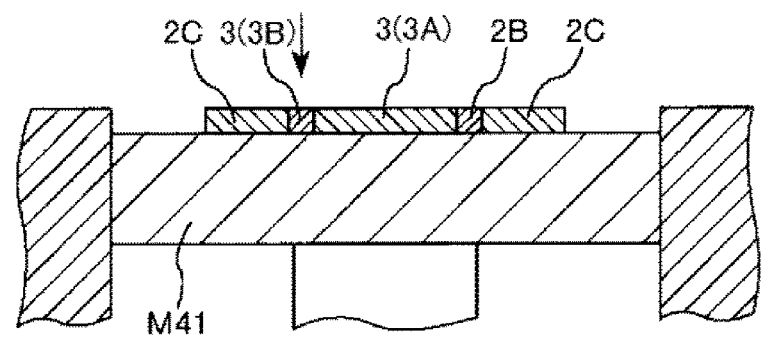
FIG. 26 is a vertical cross-sectional view schematically showing a step in the third embodiment of the three-dimensional shaped article production method according to the invention.
Figure 27:
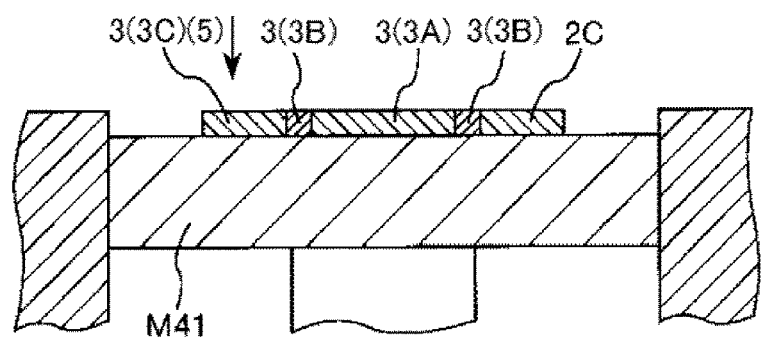
FIG. 27 is a vertical cross-sectional view schematically showing a step in the third embodiment of the three-dimensional shaped article production method according to the invention.
Figure 28:
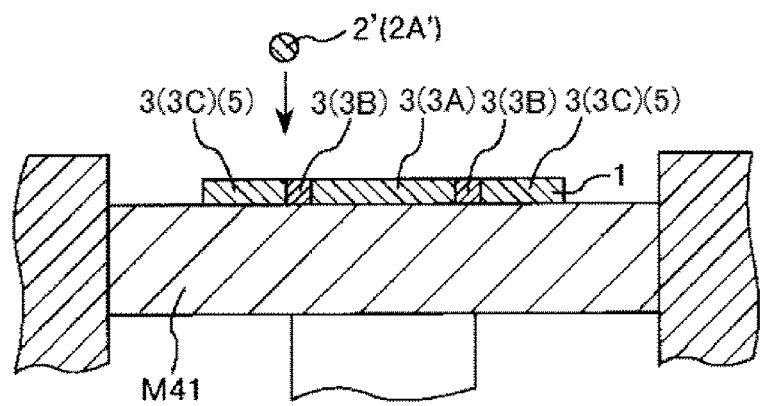
FIG. 28 is a vertical cross-sectional view schematically showing a step in the third embodiment of the three-dimensional shaped article production method according to the invention.
Figure 29:
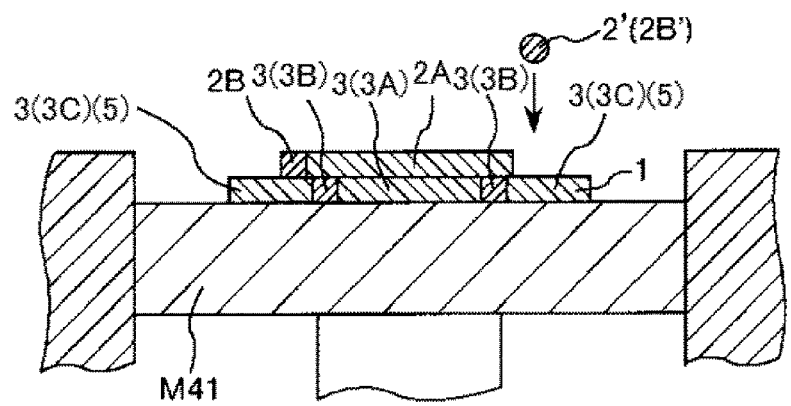
FIG. 29 is a vertical cross-sectional view schematically showing a step in the third embodiment of the three-dimensional shaped article production method according to the invention.
Figure 30:
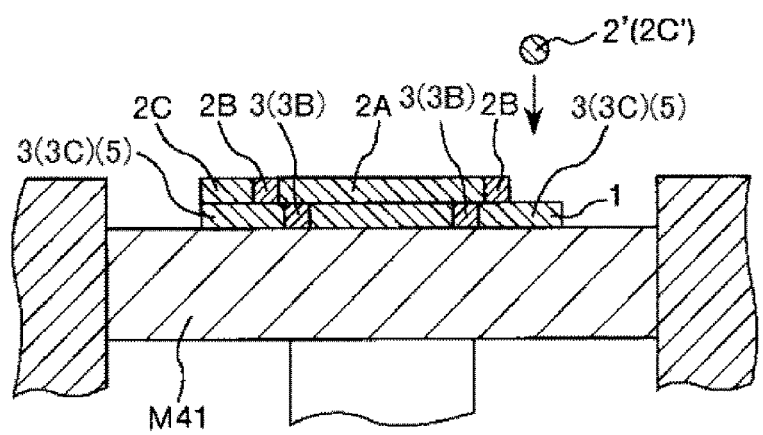
FIG. 30 is a vertical cross-sectional view schematically showing a step in the third embodiment of the three-dimensional shaped article production method according to the invention.
Figure 31:
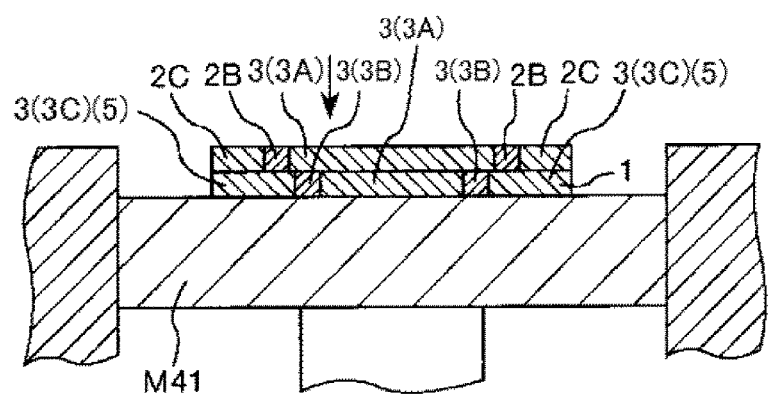
FIG. 31 is a vertical cross-sectional view schematically showing a step in the third embodiment of the three-dimensional shaped article production method according to the invention.
Figure 32:
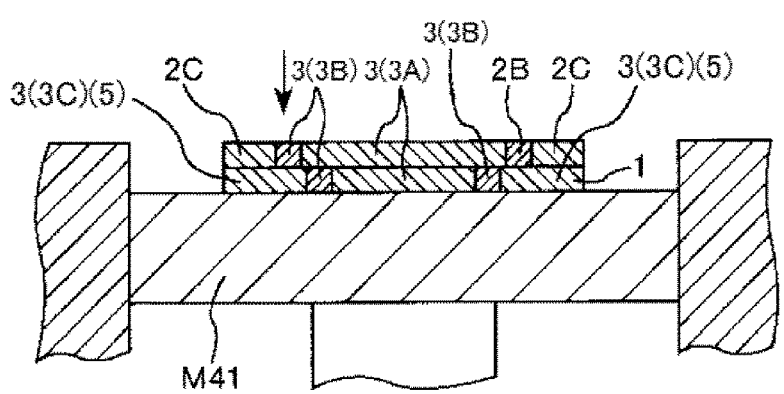
FIG. 32 is a vertical cross-sectional view schematically showing a step in the third embodiment of the three-dimensional shaped article production method according to the invention.
Figure 33:
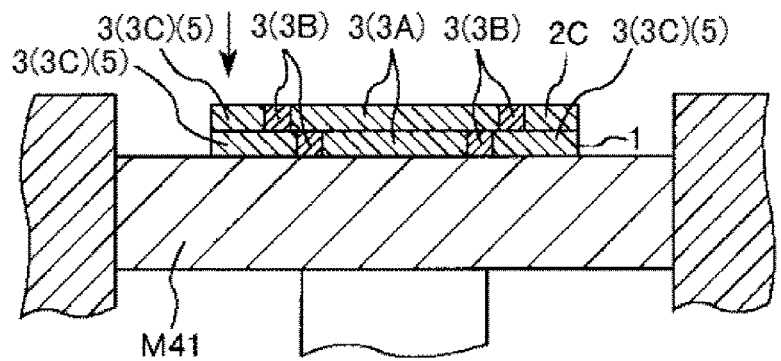
FIG. 33 is a vertical cross-sectional view schematically showing a step in the third embodiment of the three-dimensional shaped article production method according to the invention.
Figure 34:
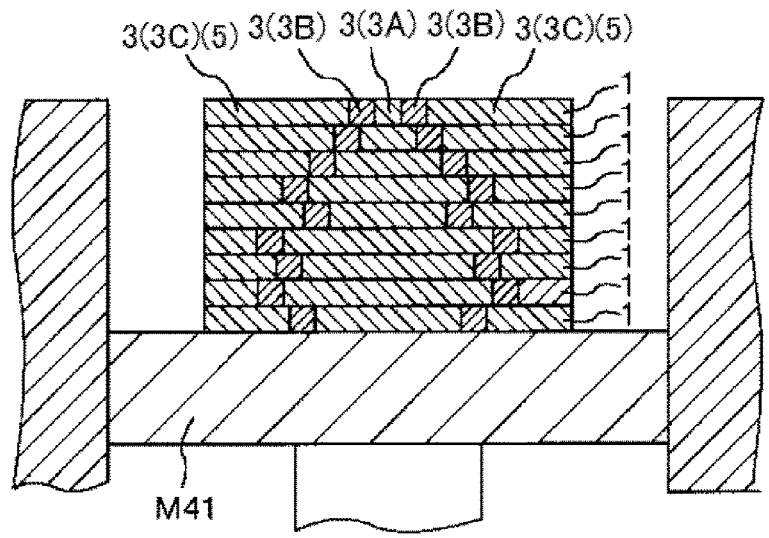
FIG. 34 is a vertical cross-sectional view schematically showing a step in the third embodiment of the three-dimensional shaped article production method according to the invention.
Figure 35:
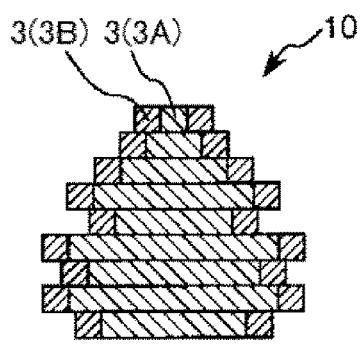
FIG. 35 is a vertical cross-sectional view schematically showing a step in the third embodiment of the three-dimensional shaped article production method according to the invention.

FIGS. 11 to 20 are vertical cross-sectional views schematically showing steps in the second embodiment of the three-dimensional shaped article production method according to the invention, and FIG. 21 is a flowchart showing the second embodiment of the three-dimensional shaped article production method according to the invention. In the following description, different points from the above-mentioned embodiment will be mainly described and the description of the same matter will be omitted.

As shown in FIGS. 11 to 20, and 21, in the production method of this embodiment, as compositions 2' containing a plurality of particles 21, a composition (an actual body part forming composition) 2A' to be used for forming an actual body part (for forming a region 2A) of a three-dimensional shaped article 10 and a composition (a support material forming composition) 2C' to be used for forming a support material (a support part) 5 (for forming a region 2C) are used. The composition (the actual body part forming composition) 2A' is a composition containing particles 21A (particularly, a composition obtained by dispersing particles 21A in a dispersion medium 22A), and the composition (the support material forming composition) 2C' is a composition containing particles 21C (particularly, a composition obtained by dispersing particles 21C in a dispersion medium 22C). The support material 5 has a function to support a region corresponding to the actual body part of the three-dimensional shaped article 10 when producing the three-dimensional shaped article 10.

Then, the respective regions formed by applying the compositions 2' in the composition supply step become the corresponding respective regions constituting the bonded parts 3 in the bonding step. That is, in the bonding step, the region 2A becomes a region 3A (see FIGS. 13 and 17) and the region 2C becomes a region 3C (see FIGS. 14 and 18).

That is, in the above-mentioned embodiment, as the plurality of types of compositions 2' to be applied in the composition supply step, the compositions 2' (the first composition and the second composition) to be used for forming the actual body part of the three-dimensional shaped article 10 are used, however, in this embodiment, as the plurality of types of compositions 2' to be applied in the composition supply step, the composition to be used for forming the actual body part of the three-dimensional shaped article 10 and the composition to be used for forming the support material 5 are used.

In this manner, in the invention, at least one type of the plurality of types of compositions to be applied in the composition supply step is not a composition to be used for forming the actual body part of the three-dimensional shaped article 10, but may be a composition which is not contained in the finally obtained three-dimensional shaped article 10 by removing substantially all the composition in the process for producing the three-dimensional shaped article 10.

Even in such a case, the same effect as described above is obtained.

In the case where a plurality of layers 1 are stacked, even if a part in which a bonded part (region 2A) corresponding to the actual body part of the three-dimensional shaped article 10 should be newly formed does not come into contact with a bonded part (region 2A) corresponding to the actual body part of the three-dimensional shaped article 10 of the previously formed layer 1, the part in which a bonded part (region 2A) should be newly formed can be favorably supported. Therefore, the three-dimensional shaped articles 10 having various shapes can be produced with high dimensional accuracy.

Further, in this embodiment, the support material (support material forming composition 2C') can prevent undesirable deformation when bonding the particles 21 while coming into contact with the surface of the region 2A (actual body part forming composition 2A') to become the actual body part of the three-dimensional shaped article 10, and therefore, the surface shape of the three-dimensional shaped article 10 can be more favorably controlled, and thus, the three-dimensional shaped article 10 having a desired surface state can be more favorably produced.

Further, in the related art, in the case where a support material is used, in the finally obtained three-dimensional shaped article, in a part of the actual body part (actual body part forming composition) to come into contact with the support material (support material forming composition), the support material is sometimes firmly adhered (bonded) thereto. In this manner, when the support material is firmly adhered (bonded) to the objective three-dimensional shaped article, it is necessary to remove the support material which is an unnecessary part by machining such as grinding or the like, however, at this time, a defect or the like sometimes occurs in the objective three-dimensional shaped article. Further, this is not preferred also from the viewpoint of the productivity of the three-dimensional shaped article.

On the other hand, in this embodiment, while obtaining the advantage of using the support material, the occurrence of the problem as described above can be more effectively prevented. As a result, while further increasing the productivity of the three-dimensional shaped article, the dimensional accuracy of the three-dimensional shaped article can be further increased. That is, the effect of the invention is more remarkably exhibited.

In the bonding step, the laser irradiation conditions (the irradiation energy and the like) may be adjusted such that the bonding strength between the particles 21C in the support material 5 is smaller than the bonding strength between the particles 21A in the actual body part. According to this, the support material 5 can be more efficiently removed in the support material removal step, and thus, the productivity of the three-dimensional shaped article 10 can be further increased.

Support Material (Support Part) Removal Step

In this embodiment, after repeatedly performing a series of steps including the composition supply step (an actual body part forming composition supply step and a support material forming composition supply step) and the bonding step (see FIG. 19), as a post-treatment step, the support material is removed (see FIG. 20). According to this, the three-dimensional shaped article 10 is taken out.

As a specific method of this step, for example, a method in which at least a portion of the support material 5 is dissolved, a method in which the support material 5 is destroyed by breaking up or the like, etc. can be exemplified.

Third Embodiment

Next, a three-dimensional shaped article production method according to a third embodiment will be described.

Figure 36:
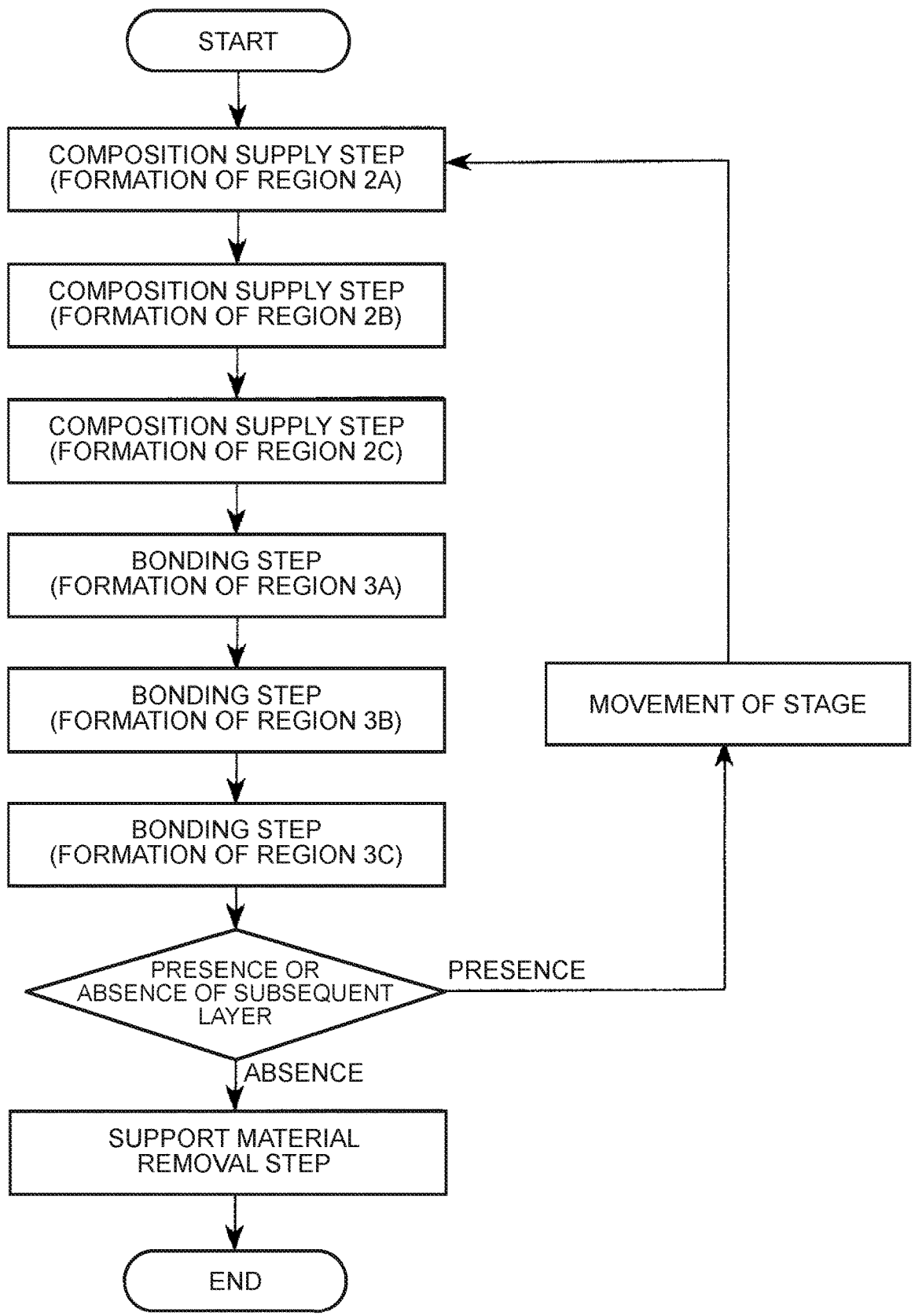
FIG. 36 is a flowchart showing the third embodiment of the three-dimensional shaped article production method according to the invention.

FIGS. 22 to 35 are vertical cross-sectional views schematically showing steps in the third embodiment of the three-dimensional shaped article production method according to the invention, and FIG. 36 is a flowchart showing the third embodiment of the three-dimensional shaped article production method according to the invention. In the following description, different points from the above-mentioned embodiments will be mainly described and the description of the same matter will be omitted.

As shown in FIGS. 22 to 35, and 36, in the production method of this embodiment, as compositions 2' containing a plurality of particles 21, a plurality of types of compositions (actual body part forming compositions) 2A' and 2B' to be used for forming an actual body part (for forming regions 2A and 2B) of a three-dimensional shaped article 10 and a composition (a support material forming composition) 2C' to be used for forming a support material (a support part) 5 (for forming a region 2C) are used. The composition (the actual body part forming composition) 2A' is a composition containing particles 21A, the composition (the actual body part forming composition) 2B' is a composition containing particles 21B, and the composition (the support material forming composition) 2C' is a composition containing particles 21C.

That is, in this embodiment, three types of compositions 2' (compositions 2A', 2B', and 2C') are used (see FIGS. 22, 23, 24, 28, 29, and 30). In this manner, in the invention, three or more types of compositions may be used.

In particular, in this embodiment, a plurality of types of compositions (the compositions 2A' and 2B') are used as the actual body part forming compositions, and also the support material forming composition (the composition 2C') is used together.

According to this, both of the effect described in the first embodiment and the effect described in the second embodiment are exhibited.

The respective regions formed by applying the compositions 2' in the composition supply step become the corresponding respective regions constituting the bonded parts 3 in the bonding step. That is, in the bonding step, the region 2A becomes a region 3A (see FIGS. 25 and 31), a region 2B becomes a region 3B (see FIGS. 26 and 32), and the region 2C becomes a region 3C (see FIGS. 27 and 33).

The relationship between the first composition and the second composition as described above is a relative relationship between two types of compositions. Therefore, in the combination of certain specific two types of compositions, a composition to serve as a first composition may function as a second composition in another combination, or may function as another composition (a composition other than the first composition and the second composition).

In the case where three or more types of compositions are used, the relationship (the relationship between the first composition and the second composition) as described above may be satisfied between at least two types of compositions among these, however, it is preferred that the relationship as described above is satisfied among the three or more types of compositions. When the relationship is applied to this embodiment, in other words, in the bonding step, it is preferred that the spectrum of the laser light to be irradiated on the region 2A (composition 2A'), the spectrum of the laser light to be irradiated on the region 2B (composition 2B'), and the spectrum of the laser light to be irradiated on the region 2C (composition 2C') are mutually different from one another.

According to this, the effect as described above is more remarkably exhibited.

Further, in the case where four or more types of compositions are used, it is preferred that the relationship as described above is satisfied for all of these compositions.

Three-Dimensional Shaped Article Production Apparatus

Next, a three-dimensional shaped article production apparatus according to the invention will be described.

Figure 37:
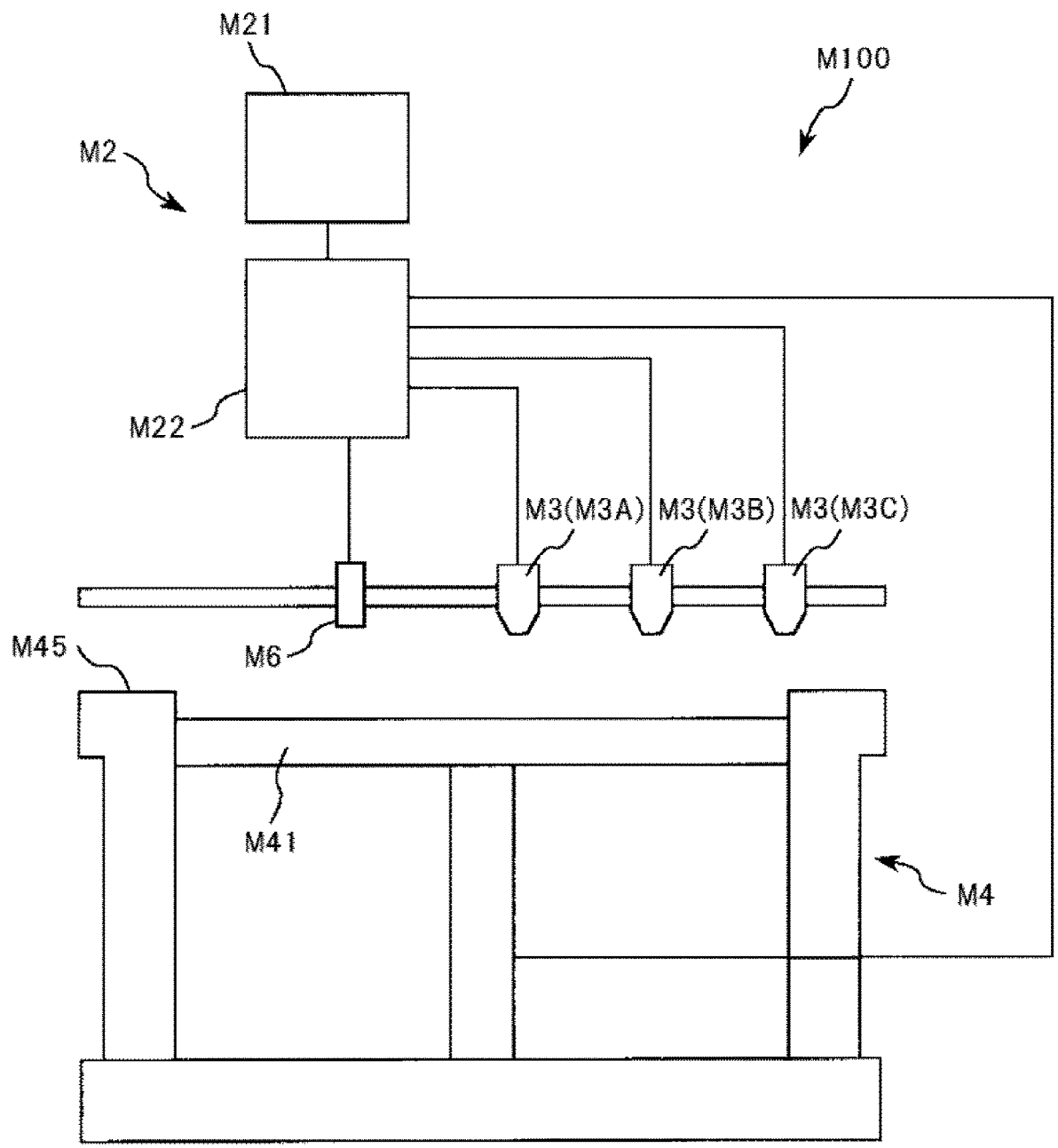
FIG. 37 is a cross-sectional view schematically showing a preferred embodiment of a three-dimensional shaped article production apparatus according to the invention.
Figure 38:
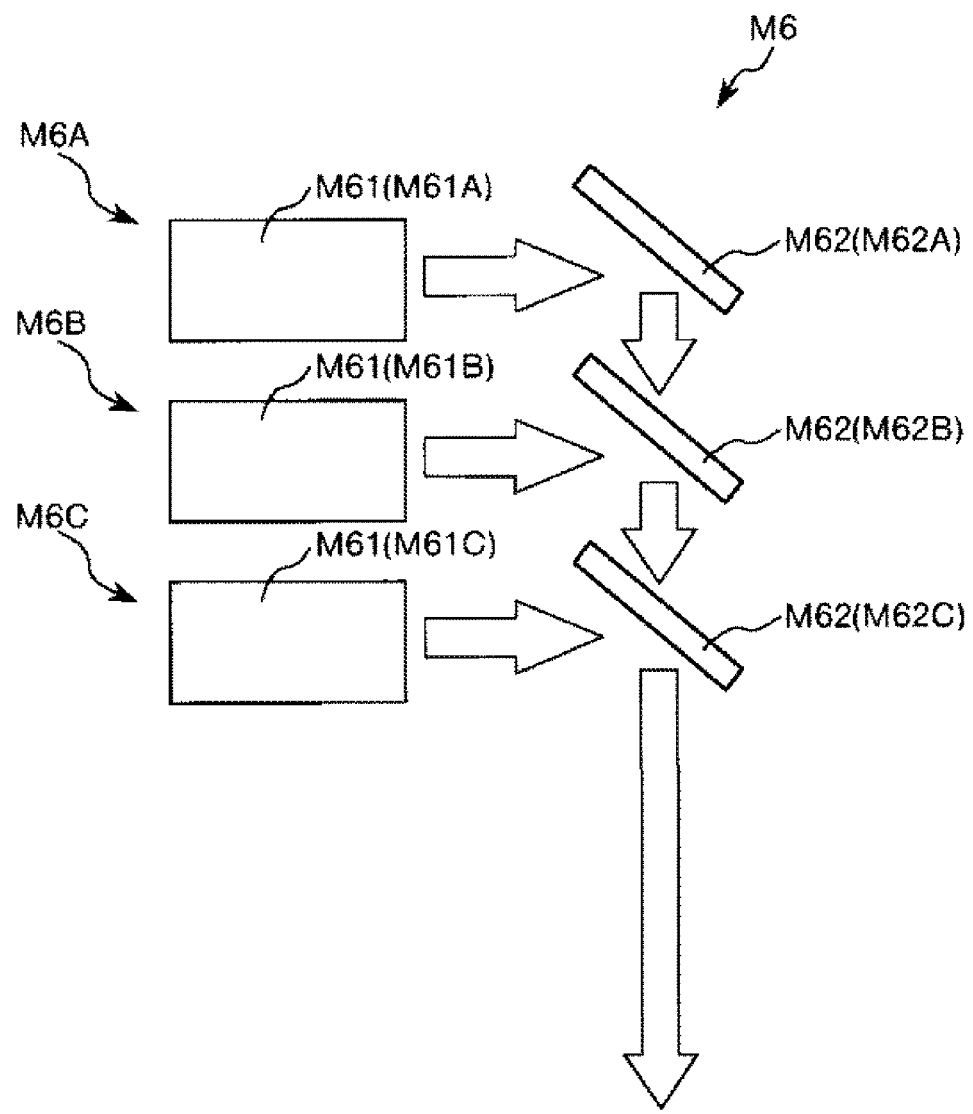
FIG. 38 is an enlarged view schematically showing the vicinity of a laser light irradiation unit of the three-dimensional shaped article production apparatus shown in FIG. 37.

FIG. 37 is a cross-sectional view schematically showing a preferred embodiment of a three-dimensional shaped article production apparatus according to the invention. FIG. 38 is an enlarged view schematically showing the vicinity of a laser light irradiation unit of the three-dimensional shaped article production apparatus shown in FIG. 37.

As shown in FIG. 37, a three-dimensional shaped article production apparatus M100 includes a control section M2, a composition supply unit (ejection unit) M3 which ejects a composition 2' containing particles 21 in a predetermined pattern, and a laser light irradiation unit M6 which irradiates the composition 2' supplied in a predetermined pattern with a laser light for bonding the particles 21.

The control section M2 includes a computer M21 and a drive control section M22.

The computer M21 is a common desktop computer or the like configured to include a CPU, a memory, etc. therein. The computer M21 digitizes the shape of a three-dimensional shaped article 10 as model data, and outputs cross-sectional data (slice data) obtained by slicing the three-dimensional shaped article 10 into a plurality of parallel layers of thin cross-sectional bodies to the drive control section M22.

The drive control section M22 functions as a control unit for individually driving the composition supply unit (ejection unit) M3, a layer forming section M4, the laser light irradiation unit M6, and the like. Specifically, the drive control section M22 controls, for example, the ejection pattern and the ejection amount of the composition 2' by the composition supply unit (ejection unit) M3, the irradiation pattern and the irradiation amount of the laser light by the laser light irradiation unit M6, the scanning rate, the lowering amount of a stage (up-and-down stage) M41, and the like.

The layer forming section M4 includes the stage up-and-down stage) M41, to which a composition 2' is supplied, and which supports a layer 1 constituted by a bonded part 3 (composition 2'), and a frame body M45 surrounding the up-and-down stage M41.

The up-and-down stage M41 is lowered sequentially by a predetermined amount according to the command from the drive control section M22 when a new layer 1 is formed on the previously formed layer 1. The lowering amount of this up-and-down stage M41 is set such that it is equal to the thickness of the layer 1 to be newly formed.

The stage M41 has a flat surface (a part to which the composition 2' is applied). According to this, the layer 1 having a highly uniform thickness can be easily and reliably formed.

The stage M41 is preferably constituted by a material having a high strength. Examples of the constituent material of the stage M41 include various metal materials such as stainless steel.

Further, the surface (a part to which the composition 2' is applied) of the stage M41 may be subjected to a surface treatment. According to this, for example, the constituent material of the composition 2' or the like is more effectively prevented from being firmly adhered to the stage M41, or the durability of the stage M41 is made particularly excellent, and thus, the three-dimensional shaped article 10 can be stably produced for a longer period of time. Examples of the material to be used for the surface treatment of the surface of the stage M41 include fluororesins such as polytetrafluoroethylene.

The composition supply unit (ejection unit) M3 is configured to move according to the command from the drive control section M22 and to supply the composition 2' stored therein to the stage M41 in a predetermined pattern.

The composition supply unit (ejection unit) M3 is configured to eject the composition 2'.

Examples of the composition supply unit (ejection unit) M3 include inkjet heads and various types of dispensers, however, in particular, a unit which ejects the composition 2' as a droplet is preferred. According to this, the composition 2' can be applied in a fine pattern, and even if the three-dimensional shaped article 10 has a fine structure, the three-dimensional shaped article 10 can be produced with particularly high dimensional accuracy and particularly high productivity.

As a droplet ejection system by the inkjet method, for example, a piezo system, a system for ejecting the composition 2' by a bubble generated by heating the composition 2', or the like can be used.

The composition supply unit (ejection unit) M3 is configured such that the pattern to be formed (the pattern of the bonded part 3), the amount of the composition 2' to be applied, and the like are controlled according to the command from the drive control section M22. The ejection pattern, the ejection amount, and the like of the composition 2' by the composition supply unit (ejection unit) M3 are determined based on the slice data. According to this, a necessary and sufficient amount of the composition 2' can be applied, and thus, the bonded part 3 (the respective regions constituting the bonded part 3) in a desired pattern can be reliably formed, and the dimensional accuracy and the like of the three-dimensional shaped article 10 can be more reliably increased.

The size (nozzle diameter) of the ejection section of the composition supply unit (ejection unit) M3 is not particularly limited, but is preferably 10 μm or more and 100 μm or less.

According to this, while further increasing the dimensional accuracy of the three-dimensional shaped article 10, the productivity of the three-dimensional shaped article 10 can be further increased.

The three-dimensional shaped article production apparatus M100 includes a plurality of composition supply units (ejection units) M3.

According to this, a plurality of types of compositions 2' can be used in combination. More specifically, for example, a plurality of types of actual body part forming compositions can be used, or the actual body part forming composition and the support material forming composition can be used in combination.

In particular, in the configuration shown in the drawing, as three composition supply units (ejection units) M3, a first composition supply unit (first ejection unit) M3A, a second composition supply unit (second ejection unit) M3B, and a third composition supply unit (third ejection unit) M3C are included.

According to this, for example, three types of actual body part forming compositions can be used, or two types of actual body part forming compositions and one type of support material forming composition can be used in combination, and so on.

Further, by adopting a configuration in which the same type of composition 2' is supplied from different composition supply units (ejection units) M3, the productivity of the three-dimensional shaped article 10 can be further increased.

In the following description, a case where two types of actual body part forming compositions and one type of support material forming composition are used in combination will be mainly described.

The laser light irradiation unit M6 irradiates (scans) a laser light for bonding the particles 21 contained in the composition 2' after the composition 2' comes into contact with a target part.

According to this, the particles 21 contained in the composition 2' are bonded to each other, whereby the bonded part 3 can be formed. In particular, by scanning the laser light in the pattern of the composition 2' containing the particles 21, energy can be selectively applied to the composition 2', and thus, the energy efficiency for the formation of the bonded part 3 can be further increased. According to this, the bonding of the particles 21 and the removal of the binder and the like can be more efficiently performed, and thus, the productivity of the three-dimensional shaped article 10 can be further increased. In addition, the energy efficiency can be increased, and therefore, it is also advantageous from the viewpoint of energy saving.

Further, the three-dimensional shaped article production apparatus M100 is configured such that the respective regions to which different types of compositions 2' are applied are irradiated with laser lights with a mutually different spectrum. More specifically, a pattern (region) formed by the composition (actual body part forming composition) 2A' supplied from the first composition supply unit (first ejection unit) M3A is irradiated with a laser light by a first laser light irradiation unit M6A, a pattern (region) formed by the composition (actual body part forming composition) 2B' supplied from the second composition supply unit (second ejection unit) M3B is irradiated with a laser light by a second laser light irradiation unit M6B, and a pattern (region) formed by the composition (support material forming composition) 2C' supplied from the third composition supply unit (third ejection unit) M3C is irradiated with a laser light by a third laser light irradiation unit M6C (see FIG. 38).

In other words, the three-dimensional shaped article production apparatus M100 is configured such that the spectra of the laser lights to be irradiated are different between a first region to which a first composition is supplied and a second region to which a second composition (a composition which is different from the first composition) is supplied.

According to this, the irradiation with a laser light can be performed under appropriate conditions depending on the type of particles contained in the respective regions (the first region and the second region), and therefore, while favorably preventing undesirable deformation or the like due to excessive melting of the particles or the like, the bonding strength between the particles can be increased. As a result, a three-dimensional shaped article having high mechanical strength and dimensional accuracy can be efficiently produced.

In particular, in this embodiment, a configuration in which a laser light emitted from a light source is not directly irradiated on a region formed by the composition 2', but a laser light emitted from a light source is reflected by a mirror, and the reflected light is irradiated on a region formed by the composition 2' is adopted.

According to this, for example, the three-dimensional shaped article production apparatus M100 can be miniaturized.

Further, in the configuration shown in the drawing, as the mirror, dichroic mirrors M62 ((M62A, M62B, and M62C) are used along with a plurality of different laser light sources M61 (M61A, M61B, and M61C).

More specifically, the dichroic mirror M62A is configured to reflect a laser light emitted from the laser light source M61A, the dichroic mirror M62B is configured to reflect a laser light emitted from the laser light source M61B and also transmit the laser light reflected by the dichroic mirror M62A, and the dichroic mirror M62C is configured to reflect a laser light emitted from the laser light source M61C and also transmit the laser lights reflected by the dichroic mirrors M62A and M62B. Then, it is configured such that the laser lights reflected by the respective dichroic mirrors M62 (M62A, M62B, and M62C) pass through the same optical path.

According to this, for example, the respective laser lights emitted from the different laser light sources M61 (M61A, M61B, and M61C) can be independently irradiated, and also the laser lights emitted from the different laser light sources M61 (M61A, M61B, and M61C) can be favorably superimposed on one another and can also be irradiated on a region formed by the composition 2'.

According to this, the energy of the laser light can be more favorably absorbed by the respective parts of the entire layer 1 including the vicinity of the boundary part between the first region and the second region, and the particles 21 can be more favorably bonded to each other. As a result, the mechanical strength and dimensional accuracy of the three-dimensional shaped article 10 can be further increased.

In addition, the position of the laser light irradiation part can be more easily adjusted.

In the invention, the production of the three-dimensional shaped article may be performed in a chamber in which the composition or the like of the atmosphere is controlled. According to this, for example, the bonding step can be performed in an inactive gas, and thus, undesirable denaturation or the like of the particles can be more effectively prevented. Further, for example, by performing the bonding step in an atmosphere containing a reactive gas, a three-dimensional shaped article constituted by a material having a composition which is different from the composition of the particles to be used as the raw material can be favorably produced.

Composition

Next, the composition to be used for producing the three-dimensional shaped article will be described.

The composition to be used for producing the three-dimensional shaped article according to the invention is a composition to be used for producing the three-dimensional shaped article and contains at least a plurality of particles.

In the above-mentioned embodiments, as the compositions 2', the actual body part forming compositions 2A' and 2B' to be used for forming the actual body part of the three-dimensional shaped article 10, and the support material forming composition 2C' to be used for forming the support material 5 are used.

Hereinafter, the actual body part forming composition and the support material forming composition will be described separately.

Actual Body Part Forming Composition

Particles

The actual body part forming composition contains a plurality of particles 21.

When the actual body part forming composition contains the particles 21, the range of choices of the constituent material of the three-dimensional shaped article 10 can be expanded, and the three-dimensional shaped article 10 having desired physical properties, texture, etc. can be favorably obtained. For example, in the case where the three-dimensional shaped article is produced using a material dissolved in a solvent, there is a limitation on the material which can be used, however, by using the actual body part forming composition containing the particles 21, such a limitation can be eliminated. Further, for example, the mechanical strength, toughness, durability, and the like of the three-dimensional shaped article 10 can be further increased, and it can be applied not only to trial production, but also to actual products.

Examples of the constituent material of the particles 21 contained in the actual body part forming composition include metal materials, metal compounds (such as ceramics), resin materials, and pigments.

When the actual body part forming composition contains particles constituted by a material containing at least one of a metal material and a ceramic material as the particles 21, for example, the texture (luxury texture), mechanical strength, durability, and the like of the three-dimensional shaped article 10 can be further increased.

In particular, when the particles 21 contained in the actual body part forming composition are constituted by a material containing a metal material, the luxury texture, massive look, mechanical strength, toughness, and the like of the three-dimensional shaped article 10 can be particularly increased. Further, heat dissipation after applying energy (energy by a laser light) for bonding the particles 21 proceeds efficiently, and therefore, the productivity of the three-dimensional shaped article 10 can be particularly increased.

Examples of the metal material constituting the particles 21 contained in the actual body part forming composition include magnesium, iron, copper, cobalt, titanium, chromium, nickel, an alloy containing at least one metal selected from these (for example, a maraging steel, stainless steel, cobalt-chrome-molybdenum, a titanium alloy, a nickel-based alloy, an aluminum alloy, a magnesium alloy, and the like).

Examples of the metal compound constituting the particles 21 include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; and composites of these materials.

Examples of the resin material constituting the particles 21 include polybutylene terephthalate, polyethylene terephthalate, polypropylene, polystyrene, syndiotactic polystyrene, polyacetal, modified polyphenylene ether, polyether ether ketone, polycarbonate, acrylonitrile-butadiene-styrene copolymers (ABS resins), polyether nitrile, polyamide (such as nylon), polyarylate, polyamideimide, polyetherimide, polyimide, liquid crystalline polymers, polysulfone, polyethersulfone, polyphenylene sulfide, and fluororesins.

As the pigment constituting the particles 21 contained in the actual body part forming composition, either of an inorganic pigment and an organic pigment can be used.

Examples of the inorganic pigment include carbon blacks (C. I. pigment black 7) such as furnace black, lampblack, acetylene black, and channel black, iron oxide, and titanium oxide, and one type or two or more types in combination selected from these can be used.

Among the inorganic pigments, titanium oxide is preferred in order to exhibit a favorable white color.

Examples of the organic pigment include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (such as basic dye chelates and acid dye chelates), dye lakes (such as basic dye lakes and acid dye lakes), nitro pigments, nitroso pigments, aniline black, and daylight fluorescent pigments, one type or two or more types in combination selected from these can be used.

The shape of the particle 21 contained in the actual body part forming composition is not particularly limited, and may be any shape such as a spherical shape, a spindle shape, a needle shape, a cylindrical shape, or a scaly shape, further, the particle may have an irregular shape, but preferably has a spherical shape.

The average particle diameter of the particles 21 contained in the actual body part forming composition is not particularly limited, but is preferably 0.1 µm or more and 20 µm or less, more preferably 0.2 µm or more and 10 µm or less.

According to this, the fluidity or flowability of the particles 21 contained in the actual body part forming composition can be made more favorable, and therefore, the composition supply step can be more smoothly performed, and also the bonding of the particles 21 in the bonding step can be more favorably performed. In addition, for example, the removal or the like of the binder and the like in the bonding step can be efficiently performed, and thus, the constituent material other than the particles 21 can be more effectively prevented from undesirably remaining in the final three-dimensional shaped article 10. Due to this, while further increasing the productivity of the three-dimensional shaped article 10, the reliability and mechanical strength of the three-dimensional shaped article 10 to be produced can be further increased, and the occurrence of undesirable irregularities or the like in the three-dimensional shaped article 10 to be produced can be more effectively prevented, and the dimensional accuracy of the three-dimensional shaped article 10 can be further increased.

The "average particle diameter" as used herein refers to an average particle diameter on a volume basis and can be determined by, for example, adding a sample to methanol, followed by dispersion for 3 minutes using an ultrasonic disperser, and then, measuring the resulting dispersion liquid using a particle size distribution analyzer employing a Coulter counter method (for example, model TA-II, manufactured by Coulter Electronics, Inc.) with an aperture of 50 µm.

The Dmax of the particles 21 contained in the actual body part forming composition is preferably 0.2 µm or more and 25 µm or less, more preferably 0.4 µm or more and 15 µm or less.

According to this, the fluidity of the actual body part forming composition can be made more favorable, and therefore, the composition supply step can be more smoothly performed, and also the bonding of the particles 21 in the bonding step can be more favorably performed. As a result, while further increasing the productivity of the three-dimensional shaped article 10, the mechanical strength of the three-dimensional shaped article 10 to be produced can be further increased, and the occurrence of undesirable irregularities or the like in the three-dimensional shaped article 10 to be produced can be more effectively prevented, and the dimensional accuracy of the three-dimensional shaped article 10 can be further increased.

The content of the particles 21 in the actual body part forming composition is preferably 50 mass % or more and 99 mass % or less, more preferably 55 mass % or more and 98 mass % or less.

According to this, while further increasing the ease of handling of the actual body part forming composition, the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

The particles 21 are constituted by a material which undergoes a chemical reaction (such as an oxidation reaction) in the process (such as the bonding step) for producing the three-dimensional shaped article 10, and the composition of the particles 21 contained in the actual body part forming composition may be different from the composition of the constituent material of the final three-dimensional shaped article 10.

The actual body part forming composition may contain two or more types of particles.

Binder

The actual body part forming composition may further contain a binder in addition to the particles 21.

According to this, for example, undesirable deformation of a pattern (region) formed using the actual body part forming composition can be more effectively prevented. As a result, the dimensional accuracy of the three-dimensional shaped article 10 can be further increased. In addition, the void ratio (porosity) in the three-dimensional shaped article 10, the density of the three-dimensional shaped article 10, and the like can be favorably adjusted.

The binder may be any as long as it has a function to temporarily fix the particles 21 in the actual body part forming composition (pattern (region)) before being subjected to the bonding step, and for example, any of various resin materials such as a thermoplastic resin or a curable resin, or the like can be used, however, it is preferred to contain a curable resin.

According to this, for example, by performing a curing treatment for the ejected actual body part forming composition at a timing before the bonding step (for example, a timing after the actual body part forming composition is ejected and before the actual body part forming composition comes into contact with (before the composition lands on) a target part (adherend), or a timing after the ejected actual body part forming composition comes into contact with (lands on) a target part (adherend)), the fluidity of the actual body part forming composition is more effectively decreased, and a pattern (region) having a more complicated shape, a pattern (region) having a fine structure, or the like can be favorably formed. Therefore, even if the three-dimensional shaped article 10 has a complicated shape or has a fine structure, it can be more favorably produced. In addition, while increasing the viscosity (the viscosity of the actual body part forming composition in a state where the curable resin is cured) in a state where the actual body part forming composition comes into contact with a target part (adherend), the viscosity of the actual body part forming composition when it is ejected can be decreased, and therefore, the ejection property of the actual body part forming composition and the productivity of the three-dimensional shaped article 10 can be further increased.

The curing treatment can be performed by irradiation with an energy ray such as a UV ray.

Hereinafter, a case where a curable resin is contained as the binder will be representatively described.

As the curable resin, for example, any of various thermosetting resins, photocurable resins, and the like can be favorably used.

As the curable resin (polymerizable compound), for example, any of various monomers, various oligomers (including dimers, trimers, and the like), prepolymers, and the like can be used, however, it is preferred that the actual body part forming composition contains at least a monomer component as the curable resin (polymerizable compound). A monomer is generally a component having a lower viscosity than an oligomer component or the like, and therefore is advantageous for further increasing the ejection stability of the curable resin (polymerizable compound).

As the curable resin (polymerizable compound), a compound whose addition polymerization or ring-opening polymerization is initiated by a radical species, a cationic species, or the like generated from a polymerization initiator by irradiation with an energy ray, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

Examples of an addition polymerizable compound include compounds having at least one ethylenically unsaturated double bond. As the addition polymerizable compound, a compound having at least one, preferably two or more terminal ethylenically unsaturated bonds can be preferably used.

An ethylenically unsaturated polymerizable compound has a chemical form of a monofunctional polymerizable compound, a polyfunctional polymerizable compound, or a mixture thereof. Examples of the monofunctional polymerizable compound include unsaturated carboxylic acids (such as acrylic acid, methacrylic acid, itaconic acid, crotonic acid, isocrotonic acid, and maleic acid) and esters thereof, and amides thereof. As the polyfunctional polymerizable compound, an ester of an unsaturated carboxylic acid with an aliphatic polyhydric alcohol compound or an amide of an unsaturated carboxylic acid with an aliphatic polyvalent amine compound is used.

Further, an addition reaction product of an ester or an amide of an unsaturated carboxylic acid having a hydroxyl group or a nucleophilic substituent such as an amino group or a mercapto group with an isocyanate or an epoxy, a dehydration condensation reaction product with a carboxylic acid, or the like can also be used. Further, an addition reaction product of an ester or an amide of an unsaturated carboxylic acid having an electrophilic substituent such as an isocyanate group or an epoxy group with an alcohol, an amine, or a thiol, further, a substitution reaction product of an ester or an amide of an unsaturated carboxylic acid having a leaving substituent such as a halogen group or a tosyloxy group with an alcohol, an amine, or a thiol can also be used.

As a specific example of the radical polymerizable compound which is the ester of an unsaturated carboxylic acid with an aliphatic polyhydric alcohol compound, for example, a (meth)acrylate ester is representative, and either a monofunctional (meth)acrylate or a polyfunctional (meth)acrylate can be used.

In the invention, a cationic ring-opening polymerizable compound having at least one cyclic ether group such as an epoxy group or an oxetane group in the molecule can be favorably used as the curable resin (polymerizable compound).

Examples of a cationic polymerizable compound include curable compounds containing a ring-opening polymerizable group, and among these, a heterocyclic group-containing curable compound is particularly preferred. Examples of such a curable compound include cyclic imino ethers such as epoxy derivatives, oxetane derivatives, tetrahydrofuran derivatives, cyclic lactone derivatives, cyclic carbonate derivatives, and oxazoline derivatives, and vinyl ethers, and among these, epoxy derivatives, oxetane derivatives, and vinyl ethers are preferred.

The actual body part forming composition may contain an oligomer (including a dimer, a trimer, or the like), a prepolymer, or the like other than the monomer as the curable resin (polymerizable compound). As the oligomer or the prepolymer, for example, an oligomer or a prepolymer containing a monomer as described above as the constituent component can be used.

In the actual body part forming composition, the binder may be contained in any form, but it is preferably in the form of a liquid (for example, in a molten state, a dissolved state, or the like). That is, the binder is preferably contained as a constituent component of the dispersion medium 22.

According to this, the binder can function as the dispersion medium 22 for dispersing the particles 21, and the ejection property of the actual body part forming composition can be further increased. Further, the binder can favorably cover the particles 21 in the bonding step, so that the stability of the shape of the pattern (region) formed using the actual body part forming composition in the bonding step can be further increased, and thus, the dimensional accuracy of the three-dimensional shaped article 10 can be further increased.

The content of the binder in the actual body part forming composition is preferably 0.5 mass % or more and 48 mass % or less, more preferably 1 mass % or more and 43 mass % or less.

According to this, while making the fluidity of the actual body part forming composition in the composition supply step more appropriate, the function to temporarily fix the particles 21 of the binder can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Solvent

The actual body part forming composition may contain a volatile solvent.

According to this, the viscosity of the actual body part forming composition can be favorably adjusted, and the ejection stability of the actual body part forming composition can be further increased. Further, the solvent can function as the dispersion medium 22 for dispersing the particles 21 in the actual body part forming composition, and can make the dispersed state of the actual body part forming composition more favorable. In addition, a volatile solvent can be efficiently removed in the process for producing the three-dimensional shaped article 10, and therefore, it is possible to effectively prevent the occurrence of a problem caused by the solvent undesirably remaining in the finally obtained three-dimensional shaped article 10.

Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, picoline, and 2,6-lutidine; and ionic liquids such as tetraalkyl ammonium acetate (for example, tetra-butyl ammonium acetate, etc.), and one type or two or more types in combination selected from these can be used.

In the case where the actual body part forming composition contains the particles 21 constituted by a metal material, it is preferred to use an aprotic solvent as the solvent. According to this, an undesirable oxidation reaction or the like of the constituent material of the particles 21 can be effectively prevented.

The content of the solvent in the actual body part forming composition is preferably 0.5 mass % or more and 30 mass % or less, more preferably 1 mass % or more and 25 mass % or less.

According to this, while further increasing the ease of handling of the actual body part forming composition, the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

Other Component

The actual body part forming composition may contain a component other than the above-mentioned components. Examples of such a component include a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, and a pH adjusting agent.

As the polymerization initiator, for example, a radical polymerization initiator or a cationic polymerization initiator can be used, however, it is preferred to use a radical polymerization initiator. The radical polymerization initiator preferably has an absorption peak in an ultraviolet range.

Examples of the radical polymerization initiator include aromatic ketones, acylphosphine oxide compounds, aromatic onium salt compounds, organic peroxides, thio-compounds (such as thioxanthone compounds and thiophenyl group-containing compounds), hexaarylbiimidazole compounds, ketoxime ester compounds, borate compounds, azinium compounds, metallocene compounds, active ester compounds, carbon-halogen bond-containing compounds, and alkylamine compounds.

In the case where the actual body part forming composition contains a polymerization initiator, in the actual body part forming composition, the polymerization initiator may be contained in any form, but it is preferably in the form of a liquid (for example, in a molten state, a dissolved state, or the like). That is, the polymerization initiator is preferably contained as a constituent component of the dispersion medium 22.

According to this, the polymerization initiator can function as the dispersion medium 22 for dispersing the particles 21, and the ejection property of the actual body part forming composition can be further increased. Further, the cured material of the binder (curable resin) can favorably cover the particles 21 in the bonding step, so that the stability of the shape of the pattern (region) formed using the actual body part forming composition in the bonding step can be further increased, and thus, the dimensional accuracy of the three-dimensional shaped article 10 can be further increased.

The content of the polymerization initiator in the actual body part forming composition is preferably 0.5 mass % or more and 10 mass % or less.

According to this, while making the fluidity of the actual body part forming composition in the composition supply step more appropriate, the function to temporarily fix the particles 21 in the binder (the cured material of the curable resin) can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Support Material Forming Composition

Next, the support material forming composition will be described.

The support material forming composition 2C' is a composition to be used for forming the support material 5.

Particles

The support material forming composition 2C' contains a plurality of particles 21C.

According to this, even in the case where the support material 5 to be formed has a fine shape or the like, the support material 5 can be efficiently formed with high dimensional accuracy.

Examples of the constituent material of the particles 21C constituting the support material forming composition 2C' include metal materials, metal compounds (such as ceramics), resin materials, and pigments.

However, it is preferred that the particles 21C constituting the support material forming composition 2C' are constituted by a material having a higher melting point than that of the particles 21 constituting the actual body part forming composition.

The shape of the particle 21C is not particularly limited, and may be any shape such as a spherical shape, a spindle shape, a needle shape, a cylindrical shape, or a scaly shape, further, the particle may have an irregular shape, but preferably has a spherical shape.

The average particle diameter of the particles 21C is not particularly limited, but is preferably 0.1 µm or more and 20 µm or less, more preferably 0.2 µm or more and 10 µm or less.

According to this, the fluidity of the support material forming composition 2C' can be made more favorable, and therefore, the supply of the support material forming composition 2C' can be more smoothly performed, and also the bonding of the particles 21C in the bonding step can be more favorably performed. Due to this, while further increasing the productivity of the three-dimensional shaped article 10, the occurrence of undesirable irregularities or the like in the three-dimensional shaped article 10 to be produced can be more effectively prevented, and the dimensional accuracy of the three-dimensional shaped article 10 can be further increased.

The Dmax of the particles 21C is preferably 0.2 µm or more and 25 µm or less, more preferably 0.4 µm or more and 15 µm or less.

According to this, the fluidity of the support material forming composition 2C' can be made more favorable, and therefore, the supply of the support material forming composition 2C' can be more smoothly performed, and also the bonding of the particles 21C in the bonding step can be more favorably performed. As a result, while further increasing the productivity of the three-dimensional shaped article 10, the occurrence of undesirable irregularities or the like in the three-dimensional shaped article 10 to be produced can be more effectively prevented, and the dimensional accuracy of the three-dimensional shaped article 10 can be further increased.

The content of the particles 21C in the support material forming composition 2C' is preferably 50 mass % or more and 99 mass % or less, more preferably 55 mass % or more and 98 mass % or less.

According to this, while further increasing the ease of handling of the support material forming composition 2C', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

The support material forming composition 2C' may contain two or more types of particles 21C.

Binder

The support material forming composition 2C' may further contain a binder in addition to the particles 21C.

According to this, for example, undesirable deformation of the support material 5 formed using the support material forming composition 2C' can be more effectively prevented. As a result, the dimensional accuracy of the three-dimensional shaped article 10 can be further increased.

The binder may be any as long as it has a function to temporarily fix the particles 21C in the support material forming composition 2C' before being subjected to the bonding step, and for example, any of various resin materials such as a thermoplastic resin or a curable resin, or the like can be used, however, it is preferred to contain a curable resin.

According to this, for example, by performing a curing treatment for the ejected support material forming composition 2C' at a timing before the bonding step (for example, a timing after the support material forming composition 2C' is ejected and before the support material forming composition 2C' comes into contact with (before the composition lands on) a target part (adherend), or a timing after the ejected support material forming composition 2C' comes into contact with (lands on) a target part (adherend)), the fluidity of the support material forming composition 2C' is more effectively decreased, and a pattern having a more complicated shape, a pattern having a fine structure, or the like can be favorably formed. Therefore, even if the three-dimensional shaped article 10 has a complicated shape or has a fine structure, it can be more favorably produced. In addition, while increasing the viscosity (the viscosity of the support material forming composition 2C' in a state where the curable resin is cured) in a state where the support material forming composition 2C' comes into contact with a target part (adherend), the viscosity of the support material forming composition 2C' when it is ejected can be decreased, and therefore, the ejection property of the support material forming composition 2C' and the productivity of the three-dimensional shaped article 10 can be further increased.

The curing treatment can be performed by irradiation with an energy ray such as a UV ray.

In the case where the support material forming composition 2C' contains a curable resin, as the curable resin, for example, those described as the constituent component of the actual body part forming composition and the like can be used.

Incidentally, the curable resin contained in the actual body part forming composition and the curable resin contained in the support material forming composition 2C' may have the same conditions (for example, the same composition or the like), or may have different conditions.

The content of the binder in the support material forming composition 2C' is preferably 0.5 mass % or more and 48 mass % or less, more preferably 1 mass % or more and 43 mass % or less.

According to this, while making the fluidity of the support material forming composition 2C' when supplying the support material forming composition 2C' more appropriate, the function to temporarily fix the particles 21C of the binder can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Solvent

The support material forming composition 2C' may contain a volatile solvent.

According to this, the viscosity of the support material forming composition 2C' can be favorably adjusted, and the ejection stability of the support material forming composition 2C' can be further increased. Further, the solvent can function as the dispersion medium 22C for dispersing the particles 21C in the support material forming composition 2C', and can make the dispersed state of the support material forming composition 2C' more favorable.

In the case where the support material forming composition 2C' contains a solvent, as the solvent, for example, those described as the constituent component of the actual body part forming composition and the like can be used.

Incidentally, the solvent contained in the actual body part forming composition and the solvent contained in the support material forming composition 2C' may have the same conditions (for example, the same composition or the like), or may have different conditions.

The content of the solvent in the support material forming composition 2C' is preferably 0.5 mass % or more and 30 mass % or less, more preferably 1 mass % or more and 25 mass % or less.

According to this, while further increasing the ease of handling of the support material forming composition 2C', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

Other Component

The support material forming composition 2C' may contain a component other than the above-mentioned components. Examples of such a component include a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, and a pH adjusting agent.

In the case where the support material forming composition 2C' contains a polymerization initiator, in the support material forming composition 2C', the polymerization initiator may be contained in any form, but it is preferably in the form of a liquid (for example, in a molten state, a dissolved state, or the like). That is, the polymerization initiator is preferably contained as a constituent component of the dispersion medium 22C.

According to this, the polymerization initiator can function as the dispersion medium 22C for dispersing the particles 21C, and the ejection property of the support material forming composition 2C' can be further increased. Further, the cured material of the binder (curable resin) can favorably cover the particles 21C in the bonding step, so that the stability of the shape of the pattern when performing the bonding step can be further increased, and thus, the dimensional accuracy of the three-dimensional shaped article 10 can be further increased.

The content of the polymerization initiator in the support material forming composition 2C' is preferably 0.5 mass % or more and 10 mass % or less.

According to this, while making the fluidity of the support material forming composition 2C' when supplying the support material forming composition 2C' more appropriate, the function to temporarily fix the particles 21C in the binder (the cured material of the curable resin) can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Further, it is preferred that the particles (the first particles and the second particles) contained in the mutually different compositions (the first composition and the second composition) satisfy the conditions as follows.

That is, it is preferred that the first particles are constituted by a metal, and the second particles are constituted by a ceramic.

These substances have greatly different physical properties, and by using these substances in combination, for example, the three-dimensional shaped article 10 can be obtained as an article constituted by a composite material of these substances, and thus can exhibit excellent properties as a whole. Further, the light absorption spectra of these substances are mutually greatly different from each other, and in the case where bonding of the particles is tried to be performed using a single type of laser light, a problem such that a sufficient bonding strength cannot be obtained, the dimensional accuracy is deteriorated, or the like particularly remarkably occurs. On the other hand, in the invention, even in the case where materials having a greatly different light absorption spectrum are used in combination, a sufficient bonding strength can be obtained while preventing undesirable deformation in the respective regions. That is, in the case of using particles constituted by the materials as described above in combination, the effect of the invention is more remarkably exhibited.

In particular, it is preferred that the first particles contain at least one member selected from the group consisting of magnesium, iron, copper, cobalt, titanium, chromium, aluminum, a maraging steel, stainless steel, cobalt-chrome-molybdenum, a titanium alloy, a nickel alloy, an aluminum alloy, a cobalt alloy, a magnesium alloy, and a cobalt-chromium alloy, and the second particles contain at least one member selected from the group consisting of alumina and silica.

According to this, the effect as described above is more remarkably exhibited.

Three-Dimensional Shaped Article

The three-dimensional shaped article according to the invention can be produced using the three-dimensional shaped article production method and the three-dimensional shaped article production apparatus according to the invention as described above.

According to this, a three-dimensional shaped article having high mechanical strength and dimensional accuracy can be provided. Further, according to the production method and the production apparatus as described above, particles having various compositions can be used, and therefore, the range of choices of the constituent material of the three-dimensional shaped article can be expanded, and the three-dimensional shaped article having desired physical properties, texture, etc. can be favorably formed.

The use of the three-dimensional shaped article according to the invention is not particularly limited, however, examples of the use include ornaments and exhibits such as dolls and figures; and medical devices such as implants.

Further, the three-dimensional shaped article according to the invention may be applied to any of prototypes, mass-produced products, and custom-made products.

Hereinabove, preferred embodiments of the invention have been described, however, the invention is not limited thereto.

For example, in the three-dimensional shaped article production apparatus according to the invention, the configuration of each section can be replaced with an arbitrary configuration exhibiting a similar function, and also an arbitrary configuration can be added.

For example, the three-dimensional shaped article production apparatus according to the invention may include a heating unit or a depressurization unit (not shown). According to this, for example, the solvent can be efficiently removed from the ejected composition (the actual body part forming composition or the support material forming composition), and thus, the productivity of the three-dimensional shaped article can be particularly increased.

Further, the three-dimensional shaped article production apparatus according to the invention may include a heating unit which heats the composition to be ejected. According to this, the viscosity of the composition is decreased, and thus the ejection property can be further increased. In addition, by heating the composition before ejection in advance, the composition after ejection is cooled, and therefore, the viscosity of the composition after ejection is increased, and thus, the stability of the shape of the pattern to be formed by the composition can be further increased. As a result, both of the productivity and the dimensional accuracy of the three-dimensional shaped article can be achieved at higher level.

Further, the three-dimensional shaped article production apparatus according to the invention may include a cooling unit (not shown). According to this, for example, the layer after bonding the particles can be rapidly cooled, and therefore, the subsequent step can be favorably performed. As a result, the productivity, dimensional accuracy, reliability, and the like of the three-dimensional shaped article can be particularly increased.

Further, in the above-mentioned embodiments, a case where the layer is directly formed on the surface of the stage has been representatively described, however, for example, a shaping plate is disposed on the stage, and the three-dimensional shaped article may be produced by stacking the layers on the shaping plate. In such a case, in the process for producing the three-dimensional shaped article, the particles constituting the lowermost layer are bonded to the shaping plate, and thereafter, the shaping plate may be removed from the three-dimensional shaped article by a post-treatment. According to this, for example, the occurrence of warpage of the layers (stacked body) in the process for stacking a plurality of layers can be more effectively prevented, and the dimensional accuracy of the finally obtained three-dimensional shaped article can be further increased.

Further, in the above-mentioned embodiments, a case where each of the respective parts of the layer is formed using the composition containing a plurality of particles has been representatively described, however, in the invention, it is only necessary to use at least two types of compositions containing a plurality of particles, and for example, in addition to two or more types of the above-mentioned compositions (compositions containing a plurality of particles), a composition which does not contain particles may be used. More specifically, for example, at least a portion of the support material may be formed using a composition which does not contain particles.

Further, in the above-mentioned embodiments, a case where in the formation of the respective layers, a plurality of types of compositions are used has been representatively described, however, it is only necessary to use a plurality of types of compositions (compositions containing a plurality of particles) in the production of the three-dimensional shaped article as a whole, and for example, at least some layers constituting the stacked body may be formed using only a single type of composition. More specifically, for example, the stacked body may include a layer formed using only the first composition and a layer formed using only the second composition among a plurality of types of compositions.

Further, in the above-mentioned embodiments, a case where a bonded part is formed in all the layers has been described, however, a layer in which a bonded part is not formed may be included. For example, a layer in which a bonded part is not formed is formed on a contact surface with the stage (immediately above the stage), and the layer may be allowed to function as a sacrifice layer. In addition, at least a portion of the support material may be formed such that the particles are not bonded to each other.

Further, in the three-dimensional shaped article production method according to the invention, the order of the steps or the treatments is not limited to the above-mentioned order, and at least some of them may be performed by changing the order. For example, in the above-mentioned second and third embodiments, a case where the support material forming composition supply step is performed after the actual body part forming composition supply step has been representatively described, however, the support material forming composition supply step may be performed, for example, after the bonding step.

Further, in the production method according to the invention, a pre-treatment step, an intermediate treatment step, or a post-treatment step may be performed as needed.

Examples of the pre-treatment step include a stage cleaning step.

Examples of the post-treatment step include a washing step, a shape adjustment step in which deburring or the like is performed, a coloring step, a coating layer forming step, and a heating treatment step for increasing the bonding strength between the particles.

Further, in the case where the composition contains a binder, a binder removal step may be further included as a step separately from the bonding step.

Further, in the above-mentioned embodiments, with respect to the case where the irradiation is performed with a plurality of different types of laser lights superimposed on one another, a case where the irradiation of a target part is performed in a state where laser lights emitted from a plurality of light sources are superimposed on one another (in a synthesized state) so that the traveling directions are aligned using dichroic mirrors has been representatively described, however, for example, laser lights emitted from different directions may be superimposed on one another on a target part without using dichroic mirrors.

Further, in the above-mentioned embodiments, a case where the composition is supplied in a predetermined pattern, and the formed pattern is irradiated with the laser light has been mainly described, however, for example, while supplying the composition, the irradiation with the laser light may be performed. That is, the composition supply step and the bonding step may be performed simultaneously.

Figure 39:
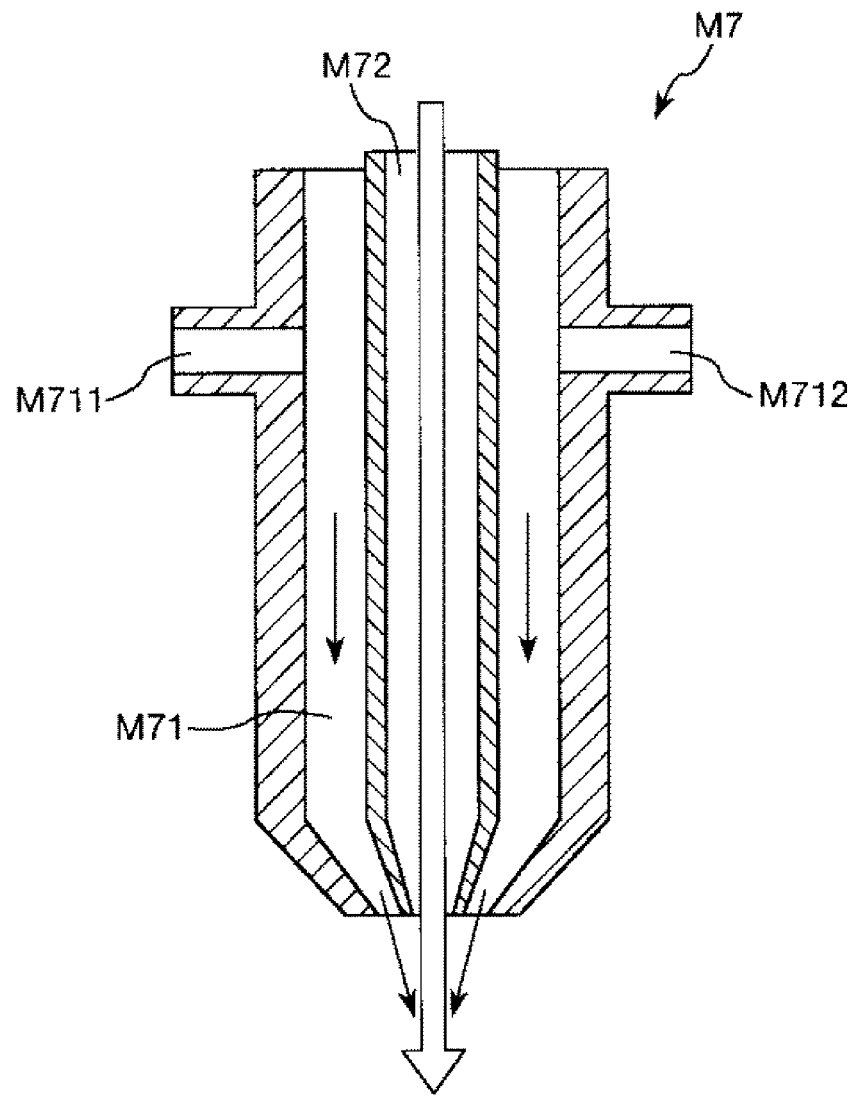
FIG. 39 is a cross-sectional view schematically showing a member (a member in which a composition supply section and a laser light irradiation section are integrated with each other) included in a three-dimensional shaped article production apparatus of another embodiment of the invention.

Further, in the above-mentioned embodiments, a case where the supply of the composition and the bonding of the composition are performed using mutually independent members has been described, however, for example, as shown in FIG. 39, the supply of the composition and the irradiation with the laser light may be performed using a single member (integrated member).

In the configuration shown in FIG. 39, a three-dimensional shaped article production apparatus M100 includes a member M7 in which a nozzle-shaped composition supply section (composition supply unit) M71 and a laser light irradiation section (laser light irradiation unit) M72 are integrated with each other.

In such a three-dimensional shaped article production apparatus M100, for example, the composition 2' can be favorably supplied (jetted) not only by the droplet ejection method as described above, but also by an air stream.

In the three-dimensional shaped article production apparatus M100 shown in FIG. 39, the laser light irradiation section (laser light irradiation unit) M72 has a columnar light guiding path, and the composition supply section M71 with a cylindrical shape is provided so as to surround the outer circumference thereof.

The composition supply section M71 is connected to a plurality of composition storage sections (not shown) for storing each of the plurality of types of compositions 2', and is configured to supply mutually different compositions 2' from different inlets M711 and M712. Further, the laser light irradiation section M72 is connected to a plurality of types of laser light sources (not shown).

Then, it is configured such that according to a part to which a predetermined composition 2' should be supplied (a part to which a bonded part should be formed), the predetermined composition 2' is selected and applied, and also the part is irradiated with a laser light with a predetermined spectrum.

By using such a three-dimensional shaped article production apparatus M100, the productivity of the three-dimensional shaped article 10 can be further increased.

Further, by adopting such a configuration, for example, even in the case where the composition 2' does not contain a dispersion medium in the form of a liquid for dispersing the particles or the case where the content of a dispersion medium in the form of a liquid in the composition 2' is small, the composition 2' can be favorably supplied to a target part, and thereafter, the bonding of the particles can be rapidly performed, and thus, the dimensional accuracy of the three-dimensional shaped article can be further increased.

Further, in the above-mentioned embodiments, a case where each of the plurality of types of compositions is ejected in a desired pattern by droplet ejection has been mainly described, however, in the invention, at least one type of composition may be applied by a method other than droplet ejection. For example, a predetermined region may be formed while flattening a composition in the form of a powder or a paste supplied from a hopper or the like by a flattening unit such as a squeegee or a roller. Even in the case of using such a method, for example, by irradiating a portion of the supplied composition with a laser light, a bonded part in a desired pattern can be formed. More specifically, for example, a mask having an opening corresponding to the first region in which the first composition containing the first particles is used formed therein is disposed on the stage M41, and a layer is formed in the opening by supplying the first composition using a squeegee. Subsequently, the mask is removed, and a layer is formed in the second region in which the second composition is used by supplying the second composition using a squeegee in the same manner. Then, a portion of the supplied composition is irradiated with a laser light. Incidentally, after forming the layer by supplying the first composition, a heating treatment may be performed so that the particles do not easily move.

Further, in the above-mentioned embodiments, a case where the actual body part of the three-dimensional shaped article is formed using one type of composition or two types of compositions has been representatively described, however, in the invention, three or more types of compositions may be used in the formation of the actual body part of the three-dimensional shaped article.

Further, in the above-mentioned embodiments, with respect to the case where the support material is formed, a case where one type of composition is used in the formation of the support material has been representatively described, however, in the invention, two or more types of compositions may be used in the formation of the support material.

The entire disclosure of Japanese patent No. 2015-246770, filed Dec. 17, 2015 is expressly incorporated by reference herein.

What is claimed is:

1. A method for producing individually stacked layers corresponding to model data of a three-dimensional object divided into a number of two-dimensional cross-sectional layers (slice data), the stacked layers being sequentially stacked as they are formed in order to generate a three-dimensional shaped article, comprising:
  forming a first layer of the three-dimensional shaped article by performing the following steps:
    forming a first composition region of the first layer by depositing a first composition comprising first particles;
    forming a second composition region of the first layer by depositing a second composition comprising second particles;
    bonding the first particles in the first composition region by irradiation with a first laser light having a first peak wavelength $\lambda 1$;
    bonding the second particles in the second composition region by irradiation with a second laser light having a second peak wavelength $\lambda 2$; and
    bonding a boundary region between the first and second composition regions by irradiation with both the first and second laser lights superimposed with each other;
    wherein a difference between the absorption ratio of light at the first peak wavelength $\lambda 1$ for the first particles and the absorption ratio of light for the second particles at the first peak wavelength $\lambda 1$ is at least 10%, and a difference between the absorption ratio of light at the second peak wavelength $\lambda 2$ for the second particles and is the absorption ratio of light for the first particles at the second peak wavelength $\lambda 2$ is at least 10%; and
  forming each remaining layer of the three-dimensional shaped article by repeating the steps performed when forming the first layer, and wherein each remaining layer is formed on top of a preceding layer.

2. The method according to claim 1, wherein at least one of the first composition and the second composition contains a solvent for dispersing the particles.

3. The method according to claim 2, wherein the steps performed when forming the first layer further comprises a step of removing the solvent prior to bonding the particles.

4. The method according to claim 1, wherein the first particles contain at least one member selected from the group consisting of magnesium, iron, copper, cobalt, titanium, chromium, aluminum, a maraging steel, stainless steel, cobalt-chrome-molybdenum, a titanium alloy, a nickel alloy, an aluminum alloy, a cobalt alloy, a magnesium alloy, and a cobalt-chromium alloy, and the second particles contain at least one member selected from the group consisting of alumina, silica, zirconia, silicon carbide, and silicon nitride.

5. The method according to claim 1, wherein the second particles have a higher melting point than the melting point of the first particles.

6. The method according to claim 1, wherein the first and second wavelengths are each selected based on different absorption ratios of the first and second particles in accordance with the following:

the peak wavelength $\lambda 1$ selected for the first laser light has a maximum peak wavelength within a range of 0.5 µm or more and 2.0 µm or less; and the peak wavelength $\lambda 2$ selected for the second laser light has a maximum peak wavelength within a range of 7.0 µm or more and 15 µm or less.

7. The method according to claim 1, wherein the first and second wavelengths are each selected based on different absorption ratios of the first and second particles in accordance with the following:

$\lambda 1$ and $\lambda 2$ satisfy the relationship: 0.1 µm$\leq |\lambda 1 - \lambda 2|$.

* * * * *